US005769501A

United States Patent [19]

Kann et al.

[11] Patent Number: 5,769,501

[45] **Date of Patent: *Jun. 23, 1998**

[54] MULTI-COMPARTMENTALIZED DUMPING BODY WITH MOVABLE FLOOR AND BULKHEAD LATCH

[75] Inventors: Dirk C. Kann; Virgil L. Collins; Andy B. Appleton, all of Guttenberg, Iowa

[73] Assignee: Kann Manufacturing Corporation, Iowa

[ * ] Notice: The term of this patent shall not extend beyond the expiration date of Pat. No. 5,716,103.

[21] Appl. No.: 655,028

[22] Filed: May 28, 1996

Related U.S. Application Data

[63] Continuation-in-part of Ser. No. 655,430, May 28, 1996, Pat. No. 5,716,103.

[51] Int. Cl.$^{6}$ .......... B60P 1/28

[52] U.S. Cl. .......... 298/23 R; 298/1 B; 298/29; 298/8 H; 298/25

[58] Field of Search .......... 298/1 B, 8 R, 298/8 H, 9, 23 R, 24, 25, 29, 30, 31, 36, 22 R; 414/408, 409, 469, 471, 486, 487; 296/24.1, 683; 105/370; 410/132, 135

[56] References Cited

U.S. PATENT DOCUMENTS

| | | | |
|---|---|---|---|
| D. 329,829 | 9/1992 | Mangino et al. | D12/15 |
| 938,012 | 10/1909 | Miller . | |
| 1,026,694 | 5/1912 | Neikirk . | |
| 1,180,292 | 4/1916 | Harris . | |
| 1,613,051 | 1/1927 | Napier . | |
| 2,255,758 | 9/1941 | Call | 214/78 |
| 2,515,334 | 7/1950 | Buye et al. | 214/82 |
| 2,772,919 | 12/1956 | Jones | 298/30 |
| 3,019,949 | 2/1962 | Allard | 222/502 |
| 3,083,849 | 4/1963 | Mottin | 214/302 |
| 3,088,383 | 5/1963 | Ekstrom | 94/46 |
| 3,161,148 | 12/1964 | Konig et al. | 105/262 |
| 3,351,384 | 11/1967 | Huck | 298/26 |
| 3,552,659 | 1/1971 | Meyer | 239/657 |
| 3,599,844 | 8/1971 | Dickson | 222/508 |
| 3,647,251 | 3/1972 | Brown et al. | 292/111 |
| 3,692,363 | 9/1972 | Tenebaum et al. | 298/24 |
| 3,709,388 | 1/1973 | Neufeldt | 214/80 |
| 3,749,445 | 7/1973 | Dalman | 298/26 |

(List continued on next page.)

FOREIGN PATENT DOCUMENTS

| | | | |
|---|---|---|---|
| 1264702A | 1/1990 | Canada | 414/406 |
| 314238 | 5/1989 | European Pat. Off. . | |
| 0 506 057 A1 | 9/1992 | European Pat. Off. . | |
| 0 654 424 A1 | 5/1995 | European Pat. Off. . | |
| 24 35 100 | 2/1976 | Germany . | |
| 29 14 532 | 10/1979 | Germany . | |
| 193-027-A | 11/1985 | U.S.S.R. | 298/23 |

OTHER PUBLICATIONS

TIMSCO, Inc. Trailer Series.

Rogers Recycle II Commingle Body (specification, drawings and theory of operation).

Concise Explanation of Relevance of References not in English language.

*Primary Examiner*—Karen B. Merritt

*Assistant Examiner*—Douglas Hess

*Attorney, Agent, or Firm*—Foley & Lardner

[57] ABSTRACT

A multiple compartment storage body for a refuse collection vehicle includes a floor, a roof, a plurality of walls extending between the floor and the roof, a partition and a bulkhead latch. The partition has a first opposing end portion pivotally coupled intermediate the floor and the roof between the walls to allow a second opposing end portion to pivot between the floor and the roof. The bulkhead latch is pivotally supported adjacent the roof and extends from the roof proximate the second opposing end portion. A lower most section of the plurality of sections includes a support member for engaging and supporting the second opposing end portion of the partition between the floor and the roof. The vertical distance the bulkhead vertically extends below the roof is adjustable to adjust a distance at which the second opposing end portion of the partition is supported above the floor.

8 Claims, 21 Drawing Sheets

U.S. PATENT DOCUMENTS

| | | | |
|---|---|---|---|
| 3,901,552 | 8/1975 | Stone | 298/24 |
| 3,921,839 | 11/1975 | Herpich | 214/302 |
| 3,966,096 | 6/1976 | Worthington | 222/389 |
| 4,067,464 | 1/1978 | Parks et al. | 214/38 BA |
| 4,067,466 | 1/1978 | Parks et al. | 214/82 |
| 4,092,044 | 5/1978 | Hoffman | 298/27 |
| 4,096,956 | 6/1978 | Gaskin | 214/82 |
| 4,103,608 | 8/1978 | Chenot | 100/53 |
| 4,113,125 | 9/1978 | Schiller | 214/302 |
| 4,114,776 | 9/1978 | Pluss | 220/22 |
| 4,242,953 | 1/1981 | St-Gelais | 100/100 |
| 4,425,070 | 1/1984 | Howells et al. | 414/498 |
| 4,830,436 | 5/1989 | Sockwell et al. | 298/8 R |
| 4,840,531 | 6/1989 | Dinneen | 414/409 |
| 4,880,342 | 11/1989 | Pradovic | 410/121 |
| 4,915,570 | 4/1990 | Rath et al. | 414/409 |
| 4,954,020 | 9/1990 | Smith et al. | 406/38 |
| 4,975,205 | 12/1990 | Sloan | 210/800 |
| 4,979,866 | 12/1990 | Croy | 414/517 |
| 4,981,411 | 1/1991 | Ramsey | 298/8 R |
| 5,035,563 | 7/1991 | Mezey | 414/409 |
| 5,035,564 | 7/1991 | Matsumoto | 414/409 |
| 5,074,737 | 12/1991 | Pellegrini et al. | 414/406 |
| 5,078,567 | 1/1992 | Lombardo | 414/525.6 |
| 5,094,582 | 3/1992 | Molzhon | 414/406 |
| 5,116,184 | 5/1992 | Pellegrini | 414/406 |
| 5,122,025 | 6/1992 | Glomski | 414/486 |
| 5,123,801 | 6/1992 | O'Daniel | 414/525.1 |
| 5,288,196 | 2/1994 | Horning et al. | 414/407 |
| 5,316,430 | 5/1994 | Horning et al. | 298/8 H |

Fig. 3
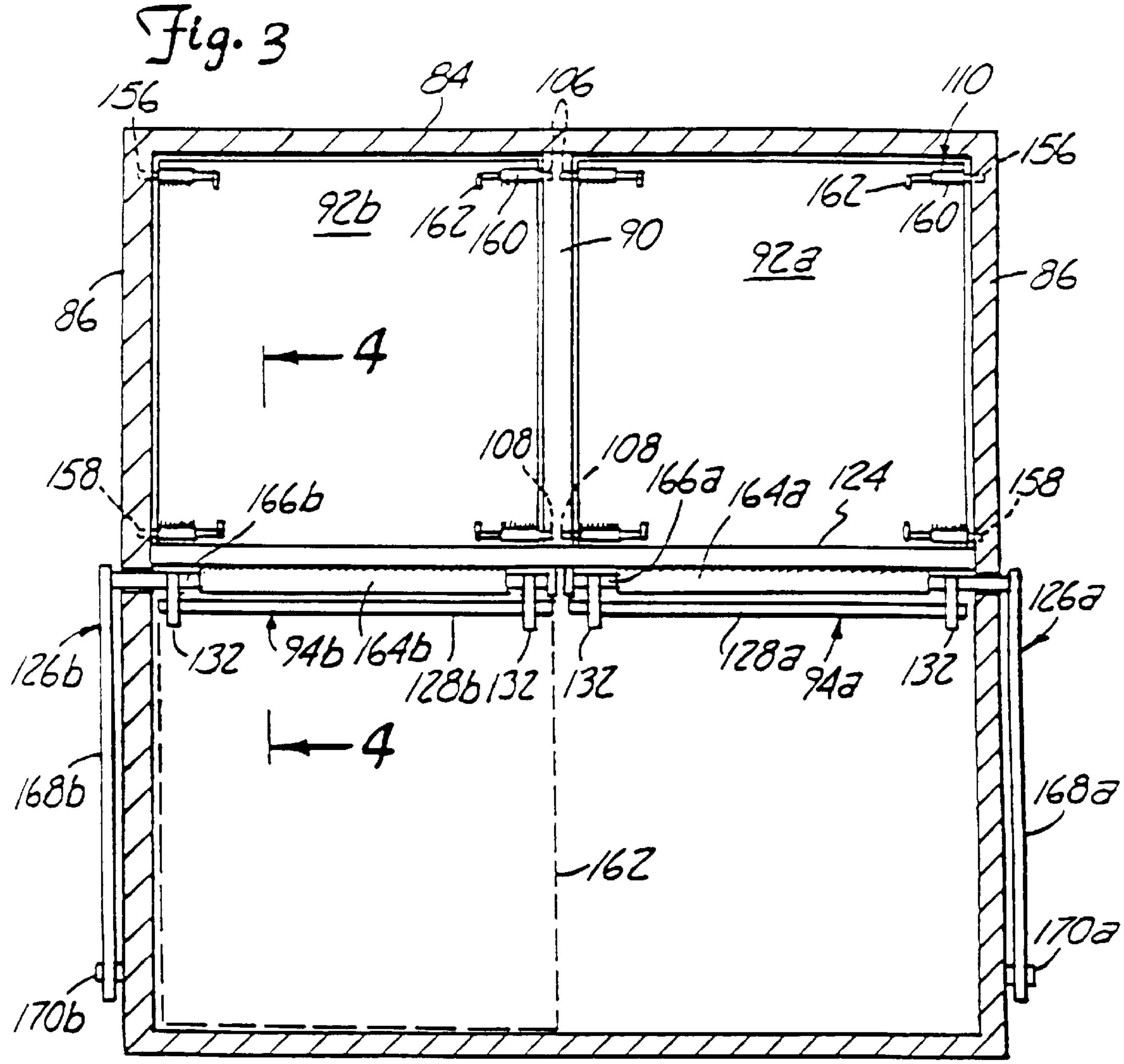
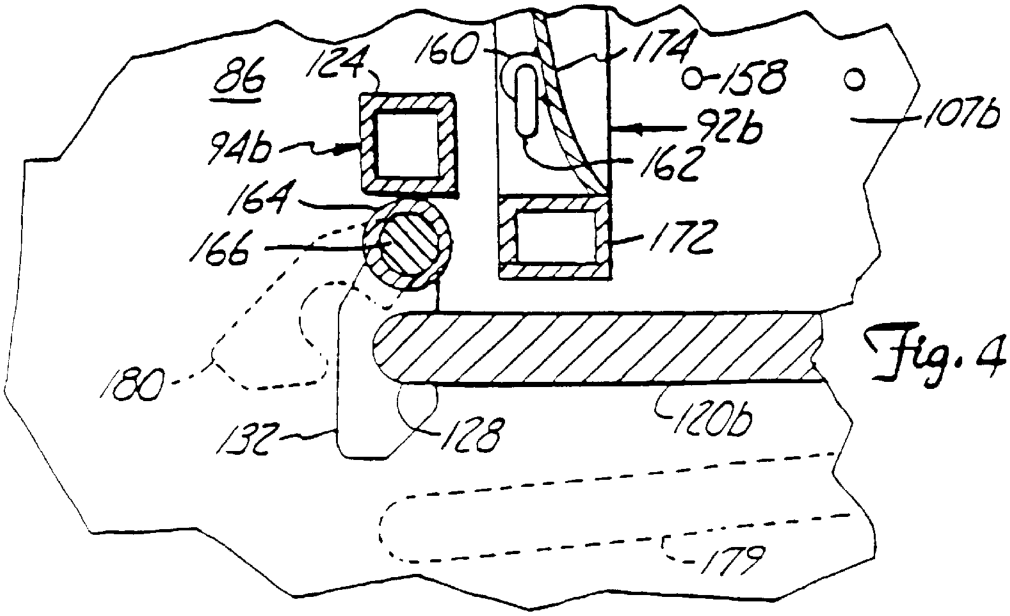
Fig. 4

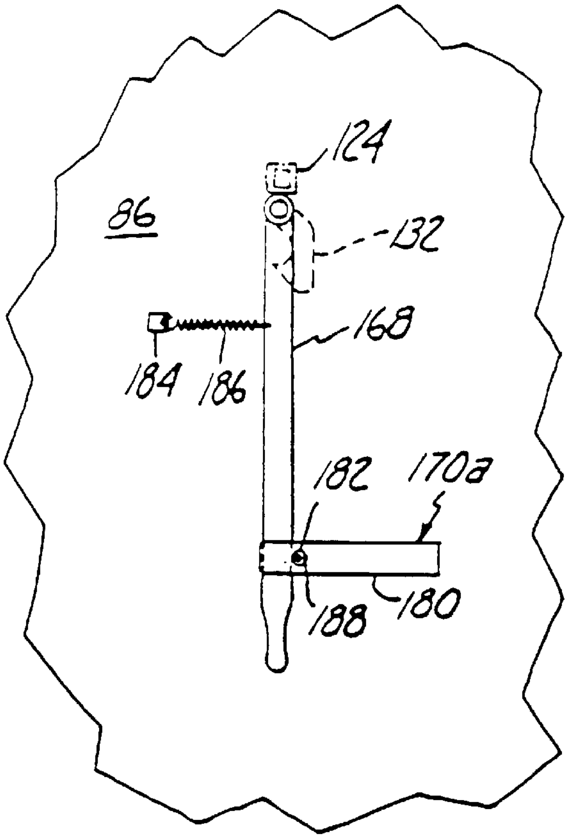
Fig. 5
Fig. 6
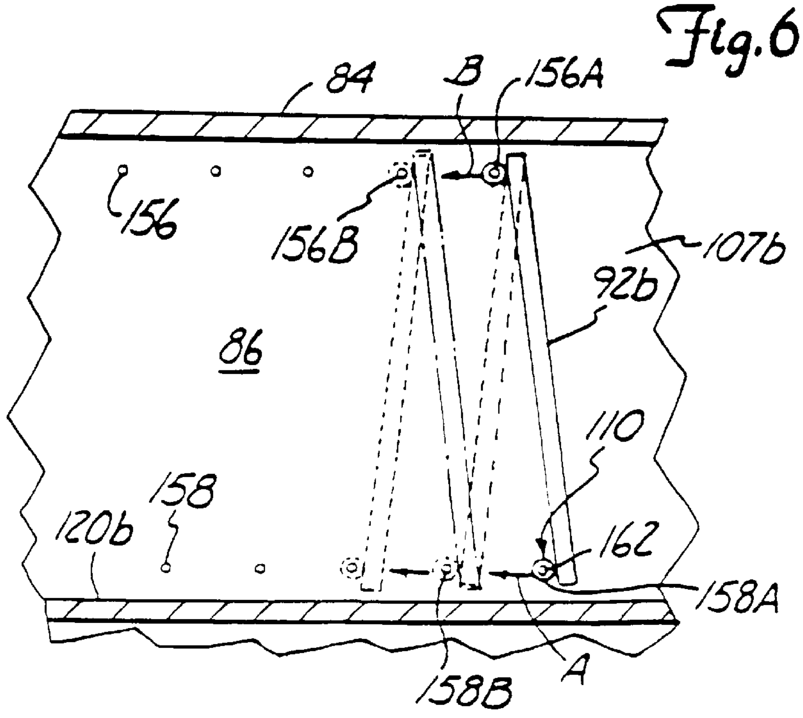

MULTI-COMPARTMENTALIZED DUMPING BODY WITH MOVABLE FLOOR AND BULKHEAD LATCH

This application is a continuation-in-part application of application Ser. No. 08/655,430 filed on May 28, 1996 and entitled MULTI-COMPARTMENTALIZED DUMPING BODY WITH SEGMENTED BULKHEAD now U.S. Pat. No. 5,716,103.

BACKGROUND OF THE INVENTION

The present invention relates to refuse vehicles for collecting and transporting garbage and recyclable materials from residences or other commercial establishments to a central disposal point such as a dump, incinerator or recycling facility. More specifically, the present invention relates to a multiple compartment storage body having an upper compartment and a lower compartment separated by a vertically movable partition and a bulkhead latch for enabling the partition to be supported at a plurality of heights to adjust a volume of the upper compartment and the lower compartment.

In recent years, communities and states have developed programs for the segregation and collection of recyclable materials to minimize the consumption of natural resources and the exhaustion of landfills. In several states and communities, recycling programs have been mandated. However, vehicles intended to collect and haul waste or garbage are generally not suitable for collecting and hauling recyclable materials. Waste collecting and hauling devices and vehicles typically include a single volume or compartment in which all collected materials are stored and transported. As a result, the collected materials are co-mingled with one another in one large single compartment which is unloaded at a central disposal site.

In contrast to general garbage, recyclable commodities are preferably segregated and contained within different compartments. For example, depending upon local recycling facilities, it is often acceptable to co-mingle glass, plastic and aluminum recyclable commodities with each other. However, these three commodities must be segregated from paper and newsprint. As a result, special vehicles having multiple compartments are required for collecting recyclable commodities. Because the amount of each commodity may vary from day to day or from route to route, it is also advantageous to provide compartments which have adjustable volumes to provide variable capacities for containing the commodities. One method of providing an adjustable volume multi-compartmentalized storage body has been to provide a center floor dovetail at a rear end of a horizontal floor dividing the storage body into an upper compartment and a lower compartment. Internal compartment volume is varied by moving the center floor dovetail at the rear to either a lowered or a raised position. The lowered position increases upper compartment volume and the raised position increases the lower compartment volume. Maintaining the dovetail in the center position equalizes both compartments.

Although the center floor dovetail permits the volume of the upper and lower compartments to be slightly adjusted, the degree of volume adjustment is limited. Because the hydraulics provide the sole support for the dovetail in the various positions, the weight and size of the dovetail are also limited. Moreover, because the dovetail must separate the upper compartment from the lower compartment, the dovetail is limited to the three positions. As a result, the ability of the dovetail to provide for various compartment volumes is also severely limited.

As refuse is filled within each compartment of multiple compartment vehicles, the refuse tends to become compacted. Moreover, to increase the mass of materials which may be carried and transported within the storage body, refuse vehicles typically include rams or compactors for further compacting the refuse within the individual compartments. As the number of compartments within the storage body increase, the need for further compacting the refuse material also increases. Compaction of the refuse materials permits larger amounts of refuse material to be contained within the storage body, thereby reducing the number of trips and the total cost associated with collecting the refuse. However, compaction of the refuse material within the storage body also makes unloading the refuse from the vehicle more difficult. As a result, compacted refuse within the storage body must be loosened and uncompacted so that the material may be dumped or pushed from the storage body. Loosening the compacted refuse or recyclable material requires additional time and tools and increases the cost of operating the refuse collection vehicle.

SUMMARY OF THE INVENTION

The present invention is an improved multiple compartment storage body for a refuse collection vehicle body. The multiple compartment storage body includes a floor, a roof, a plurality of walls extending between the floor and the roof, a partition between the floor and the roof and a bulkhead. The floor, roof and plurality of walls define an interior storage space and a discharge opening. The partition has a first opposing end portion pivotally supported intermediate the floor and the roof between the walls to allow a second opposing end portion to pivot between the floor and the roof. The partition creates an upper compartment and a lower compartment. The bulkhead is supported proximate the second opposing end portion of the partition and further segregates the upper compartment from the lower compartment.

In one preferred embodiment, the bulkhead is movable between a first engaged position and a second disengaged position. In the first engaged position, the bulkhead engages the second opposing end portion of the partition to support the second opposing end portion above the floor. In the disengaged position, the bulkhead is disengaged from the second opposing end portion to permit the second opposing end portion to pivot to the floor.

In another preferred embodiment, the bulkhead has an adjustable vertical length. The bulkhead is composed of a plurality of sections hinged to one another. In one embodiment, the sections are guided and supported by a track extending adjacent the rood so that the bulkhead may be lifted or lowered to a selected height below the roof. In another embodiment, the sections may be folded adjacent one another to adjust the vertical length of the bulkhead and to adjust the height at which the partition is supported between the floor and the roof to minimize obstructions between the compartments and the discharge opening.

In yet another embodiment, the bulkhead is pivotally supported adjacent the roof and extends from the roof into the interior storage space proximate the second opposing end portion. A lower most section of the plurality of sections includes a support member for engaging and supporting the second opposing end portion of the partition between the floor and the roof. Sections above the lower most section may be removed to adjust a height of the bulkhead and to adjust a distance at which the second opposing end portion of the partition is supported above the floor.

BRIEF DESCRIPTION OF THE DRAWINGS

FIG. 3 is a sectional view as taken along lines 3—3 of FIG. 1.

FIG. 4 is an enlarged fragmentary sectional view as taken along lines 4—4 of FIG. 3.

FIG. 5 is a fragmentary side elevational view of a portion of the storage body of the refuse collection vehicle of FIG. 1, showing a locking/release mechanism.

FIG. 6 is a sectional view of a portion of the storage body of FIG. 1 illustrating adjustable positioning of bulkheads within the storage body.

DETAILED DESCRIPTION OF THE PREFERRED EMBODIMENTS

Throughout the specification of the application, various terms are used such as “top”, “bottom”, “front”, “rear”, “left”, “right”, and the like. These terms denote directions with respect to the drawings and are not limitations of orientation of the present invention. Rather, these terms are provided for clarity in describing the relationship between members and compartments of the refuse collection vehicle. For example, the terms “right” and “left” are used in describing relationships between elements when viewed from the rear end of the refuse collection vehicle.

Figure 1:
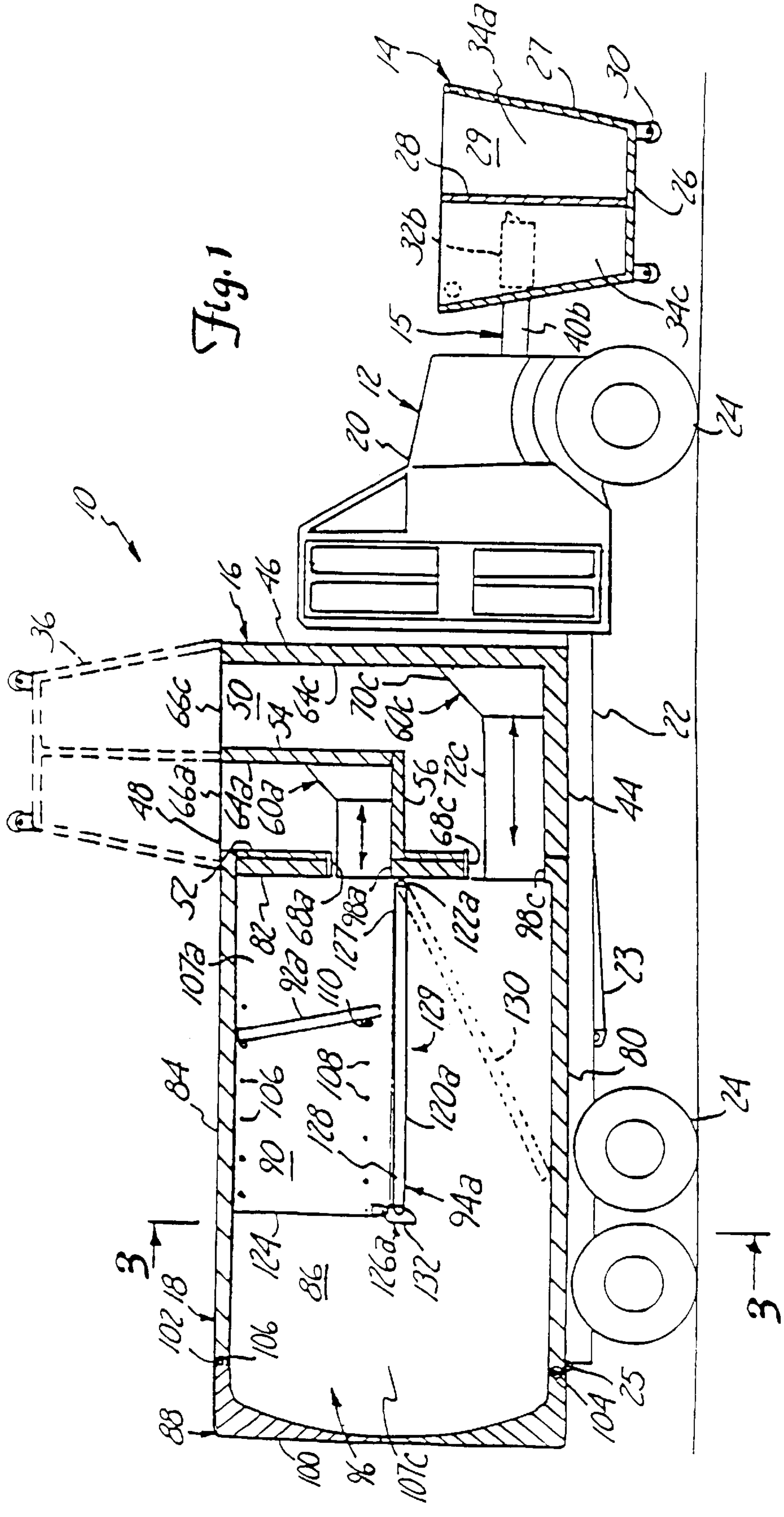
FIG. 1 is a side elevational view of a refuse collection vehicle, with portions shown in section.

As seen in FIG. 1, refuse collection vehicle 10 generally includes chassis 12, loading trough or bin 14, lifting apparatus 15, compactor 16 and storage body 18. Chassis 12 may have a variety of configurations depending upon the configurations of loading bin 14, compactor 16 and the storage body 18 being used. Chassis 12 supports and transports compactor 16 and storage body 18 between material pick up and disposal sites. Chassis 12 further lifts and tips storage body 18 to unload refuse from storage body 18 and includes cab 20, frame 22, lifting jack 23 and wheels 24. Cab 20 is positioned forward of compactor 16 and storage body 18. Cab 20 houses an engine, drive train and vehicle controls of vehicle 10. Frame 22 extends rearwardly from cab 20 and provides a base for supporting compactor 16 and storage body 18. Preferably, frame 22 is pivotally coupled to compactor 16 and storage body 18 at pivot 25.

Lifting jack 23 preferably is a hydraulic piston-cylinder assembly as is conventionally used for tipping or lifting storage bodies in grain and refuse vehicles. Lifting jack 23 is mounted between frame 22 and compactor 16 in storage body 18 towards a front end of chassis 12. Lifting jack 23 lifts and tips compactor 16 and storage body 18 near a front end of chassis 12 about pivot 25 so that refuse may be unloaded from a rear end of storage body 18. Alternatively, lifting jack 23 may be mounted between frame 22 and a side of either compactor 16 or storage body 18 for tipping the storage body 18 to one side to discharge refuse out a side discharge opening. As can be appreciated, lifting jack 23 may alternatively employ pneumatic or other means for tipping compactor 16 and storage body 18. Wheels 24 are rotatably mounted to cab 20 and frame 22 to support cab 20 and frame 22 above the surface.

Figure 2:
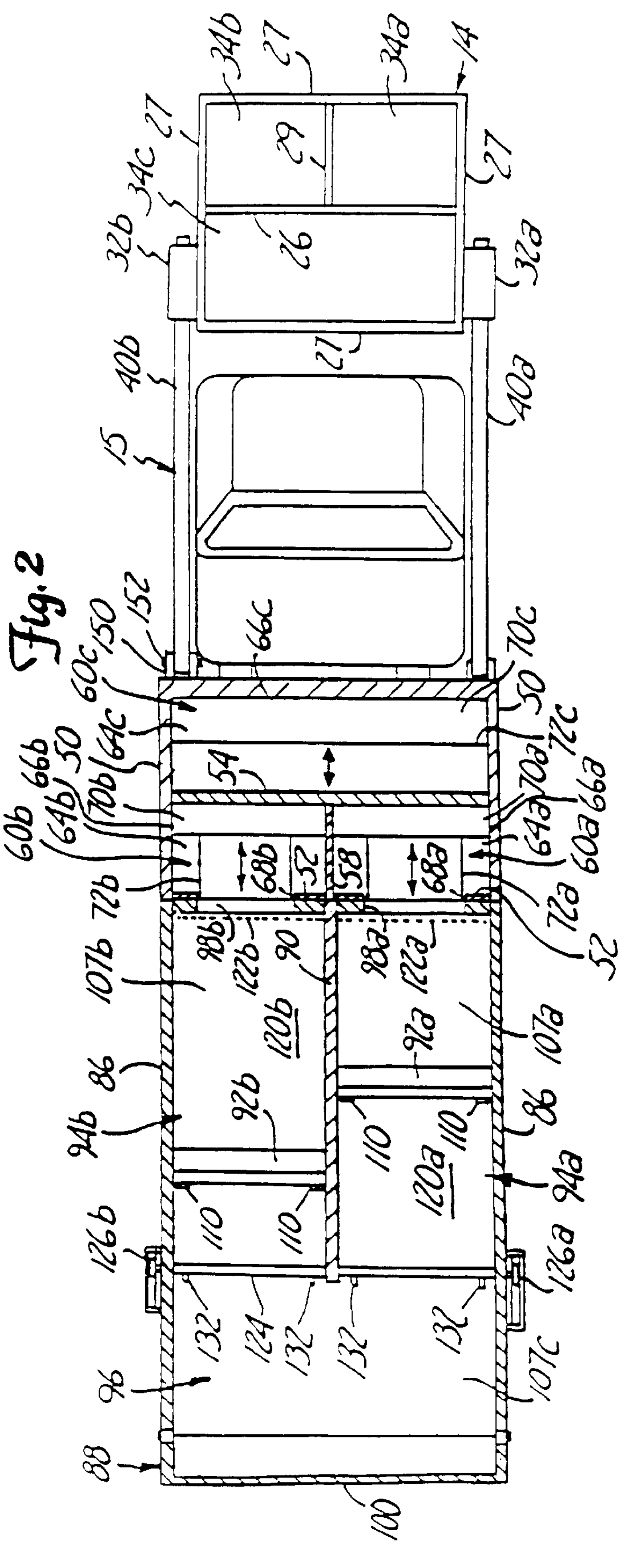
FIG. 2 is a top view of the refuse collection vehicle of FIG. 1, with portions shown in section.

Loading bin 14 is a generally rectangular cart or dumpster including a bottom floor 26, a plurality of exterior side walls 27, interior dividing walls 28,29, rollers 30 and lifting lugs 32*a* (as shown in FIG. 2) and 32*b*. Floor 26 and exterior walls 27 define a storage capacity or volume for loading bin 14. Dividing wall 28 extends between floor 26 and exterior walls 27 to divide the storage volume of loading bin 14 into a front half and a back half. Dividing wall 29 extends from dividing wall 28 to the forward end of exterior walls 27 to divide the remaining front half of loading bin 14 into two side-by-side compartments. Overall, dividing walls 28 and 29 in conjunction with floor 26 and exterior wall 27 define three distinct compartments, front right compartment 34*a*, front left compartment 34*b* (shown in FIG. 2) and rear compartment 34*c*. Each compartment 34 is sized and designed for the reception of garbage and recyclable materials which must be separated. Preferably, rear compartment 34*c* extends along an entire rear half of loading bin 14 for reception of generally non-recyclable garbage. Front right compartment 34*a* and front left compartment 34*b* divide the remaining front half of loading bin 14 for the reception of paper and glass or plastic material, respectively.

Rollers 30 extend downward from floor 26 of bin 14 and support bin 14 above the surface. Rollers 30 permit bin 14 to be detached from vehicle 10 for movement to otherwise inexcessible loading and fill stations. Lifting lugs 32*a*, 32*b* are preferably cylindrical or tubular shaped and sized for receiving an engaging member of lifting apparatus 15.

Lifting lugs 32*a*, 32*b* are mounted beside portions of exterior walls 27. Preferably, lifting lugs 32*a*, 32*b* are located towards a rear portion of loading bin 14. Lifting lugs 32*a*, 32*b* permit loading pin 14 to be releasably engaged by lifting apparatus 15 so that loading bin 14 may be lifted above compactor 16 and unloaded into compactor 16 as shown by phantom lines 36. Alternatively, loading bin 14 may comprise side-loading bins secured to one or both sides of compactor 16 wherein the compartments are preferably lifted along and adjacent to sides of compactor 16 until above compactor 16 where bin 14 is tipped to dispense the materials from the compartments into compactor 16. As can be appreciated, bin 14 may alternatively be fixedly attached to lifting apparatus 15.

Lifting apparatus 15 lifts the contents of loading bin 14 above compactor 16 to unload the contents of loading bin 14 into compactor 16 as shown by phantom lines 36. As shown in FIG. 2, lifting apparatus 15 preferably includes a pair of lifting arms or forks 40*a* and 40*b* which pivotally extend in front of cab 20. Forks 40*a*, 40*b* engage and couple with lifting lugs 32*a*, 32*b*. Forks 40*a*, 40*b* are lifted by power devices, preferably hydraulic piston/cylinder assemblies which are hydraulically controlled by control means within cab 20 as is conventionally known in the art. In operation, refuse collection vehicle 10 is driven up to loading bin 14 so that forks 40*a*, 40*b* engage lifting lugs 32*a* and 32*b*. The power device is then used to lift forks 40*a*, 40*b* and loading bin 14 upward and rearward of cab 20 as shown by phantom lines 36 to empty the contents of compartments 34 into compactor 16.

Compactor 16 is mounted to frame 22 between storage body 18 and cab 20 and includes floor 44, front wall 46, roof 48, side walls 50 (shown in FIG. 2), rear wall 52, forward chute partitioning wall 54, upper chute floor 56, intermediate chute wall 58, and ram assemblies 60*a*, 60*b* (shown in FIG. 2) and 60*c*. Floor 44, front wall 46, roof 48, side walls 50 and rear wall 52 house and define compactor 16. Forward chute wall 54 extends downward from roof 48 between side walls 50. Upper chute floor 56 horizontally extends from rear wall 58 to a lower end of forward chute partitioning wall 54. Intermediate chute wall 58 vertically extends between rear wall 52 and forward chute wall 54, from roof 48 to floor 56, intermediate side walls 50. Forward chute wall 54, upper chute floor 56 and intermediate chute wall 58 divide compactor 16 into three compaction compartments or chutes 64, rear right compaction chute 64*a*, rear left compaction chute 64*b* (shown in FIG. 2) and forward compaction chute 64*c*. Roof 48 includes openings 66*a*, 66*a* (shown in FIG. 2) and 66*a* which communicate with chutes 64*a*, 64*b* and 64*c*, respectively. Rear wall 58 also includes openings 68*a*, 68*b* (shown in FIG. 2) and 68*b* in communication with a lower end of chutes 64*a*, 64*b* and 64*c*, respectively. Opening 68*c* is preferably adjacent floor 50 while opening 68*a* and 68*b* are adjacent floor 62 so that openings 68*a*, 68*b* and 68*b* are in alignment with ram assemblies 60*a*, 60*b* and 60*c*, respectively.

Ram assemblies 60*a*, 60*b* and 60*c* (schematically shown) are conventionally known in the field and are provided for pushing and compacting waste and recyclable materials in a pre-selected direction. Ram assembly 60*c* is positioned toward a lower end of chute 64*c* and includes cover plate 70*c* and ram 72*c*. Cover plate 70*c* extends between side walls 50 and is slightly inclined downwardly and rearwardly. Cover plate 70*c* houses and protects ram 72*c* while channeling waste and recyclables forwardly of ram 72*c* when ram 72*c* is in a retracted position. Ram 72*c*, which is schematically shown, is well-known in the art. Ram 72*c* extends from below cover plate 70*c* within chute 64*c* adjacent floor 44 to rear wall 52. In a typical arrangement, ram 72*c* includes a fluid actuated piston and cylinder assembly wherein the piston is coupled to a front blade of the ram to move the ram rearward. Ram 72*c* is preferably controlled through pneumatic or electrical control means which form cab 20 which actuates ram 72*c*. Ram 72*c* pushes waste and recyclables within chute 64*c* out opening 68*c* into storage body 18. As can be appreciated, ram 72*c* may alternatively be configured such that ram 72*c* may be extended rearwardly beyond rear wall 52 into storage body 18 to further compact waste and recyclable material. Ram assemblies 60*a* and 60*b* are similar to ram assembly 60*c* but are positioned within lower ends of chutes 64*a* and 64*b*, respectively.

Storage body 18 is mounted to frame 22 adjacent rear wall 44 of compactor 16 and includes floor 80, front wall 82, roof 84, side walls 86, tailgate assembly 88, intermediate dividing wall 90, movable bulkheads 92*a* and 92*b* (shown in FIG. 2) and drop floor assemblies 94*a* and 94*b* (shown in FIG. 2). Floor 80, front wall 82, roof 84, side walls 86 and tailgate assembly 88 define interior storage space 96 of storage body 18. Front wall 82 includes upper right opening 98*a*, upper left opening 98*b* (shown in FIG. 2), and lower opening 98*c*. Openings 98*a*, 98*b* and 98*c* are in communication with and preferably aligned with openings 68*a*, 68*b* and 68*c*, respectively so that ram assemblies 66*a*, 66*b* and 66*c* may push and compact waste and recyclables through their respective aligned openings into interior storage space 96. Although sidewalls 86 are shown as being linear from floor 80 to roof 84, sidewalls 86 may alternatively be curved or bowed outwardly between floor 80 and roof 84.

Tailgate assembly 88 includes wall 100 which has a curved inner surface. Wall 100 is pivoted to roof 84 and side walls 86 about pivot 102 and releasably latched to floor 80 and side walls 86 at latch 104. Wall 100 encloses the rear portion of interior storage space 96 to retain waste and recyclable commodities within interior storage space 96. Hinge 102 and latch 104 permit wall 100 to be lifted to thereby open and define a discharge opening 106 through which the commodities may be emptied from interior storage space 96. Preferably, tailgate assembly 88 is hydraulically operated to lift wall 100 and to open discharge opening 106. Because wall 100 has a curved inner surface, waste and recyclable commodities pushed rearward by ram 72*c* are lifted along wall 100 to spaces above drop floor assemblies 94. Alternatively, wall 100 vertically extends between floor 80 and roof 84 and additionally includes a plate extending between side walls 86 and slanting downward and forwardly (to the right as viewed in FIG. 1) from wall 100 towards floor 80 so that material pushed rearward by ram 72*c* is lifted above drop floor assemblies 94.

Intermediate dividing wall 90 extends downward from roof 84 and rearward from front wall 82 to divide upper and forward portions of storage space 96 into left and right halves. Intermediate dividing wall 90, movable bulkheads 92*a*, 92*b* and drop floor assemblies 94*a*, 94*b* divide storage space 96 into three separate distinct compartments (upper right compartment 107*a*, upper left compartment 107*b* (shown in FIG. 2), and central compartment 107*c*). As a result, each compartment is used to contain and separate different commodities.

Divider wall 90 is preferably positioned in alignment with intermediate chute wall 58 between openings 66*a*, 98*a* and 66*b*, 98*b*. Divider wall 90 includes positioning detents 106, 108. Positioning detents 106 extend through or at least partially into dividing wall 90 at selectively spaced positions along a top edge of divider wall 90. Positioning detents 108 extend through or at least partially into dividing wall 90 at selectively spaced positions along a bottom edge of divider wall 90. In the preferred embodiment, positioning detents 106 are spaced 6 inches apart from one another and positioning detents 108 are spaced 6 inches apart from one another. The spacing between detents 106 is preferably offset 3 inches from the spacing of detents 108 so that each detent 106 is longitudinally located 3 inches from adjacent corresponding detents 108. Similarly, corresponding positioning holes are provided opposite positioning detents 106, 108 adjacent side walls 86. As explained in greater detail later, positioning detents 106, 108 and the holes within the side walls 86 allow movable bulkheads 92*a* and 92*b* to be selectively positioned at various locations along the longitudinal length of storage space 96 to adjust the length and thereby the volume of upper storage compartments 107*a* and 107*b*.

Movable bulkheads 92*a* and 92*b* are located on opposite sides of divider wall 90. Movable bulkhead 92*a* is located on the right side of divider wall 90 and movable bulkhead 92*b* is on the left side of divider wall 90. Movable bulkheads 92*a* and 92*b* each preferably comprise a square tubular frame having a sheet of sheet steel welded in place within the frame. Alternatively, bulkheads 92*a* and 92*b* may be made of rigid high strength plastics which are lighter weight than sheet steel. Each movable bulkhead 92*a*, 92*b* further includes positioning members 110 located at each of the four corners on a rear surface of movable bulkheads 92*a*, 92*b*. Positioning members 110 are sized and carried so as to engage corresponding positioning detents 106, 108 within divider wall 92 and similar positioning holes adjacent side walls 86. As a result, bulkheads 92*a* and 92*b* may be positioned forwardly and rearwardly to decrease or enlarge the volumetric capacity of compartments 107*a* and 107*b*, respectively. Because detents 106, 108 are provided on divider wall 90 and because similar aligned corresponding holes are provided adjacent side walls 86, bulkheads 92*a*, 92*b* are independently supported and movable with respect to drop floor assemblies 94*a*, 94*b*.

Drop floor assemblies 94*a* and 94*b* are preferably positioned on opposite sides of divider wall 90 and include horizontal partitions or floor panels 120*a*, 120*b* (shown in FIG. 2), hinges 122*a*, 122*b* (shown in FIG. 2), hook latch support cross tube 124 and hook latches 126*a*, 126*b*. Floor panels 120*a*, 120*b* are generally flat, rectangular sheets of sheet steel which act as floors for compartments 107*a*, 107*b*, respectively. Alternatively, floor panels 120*a*, 120*b* may be formed from rigid high strength plastics which are lighter in weight than sheet steel. Floor panels 120*a*, 120*b* each include opposing end portions 127, 128. End portion 127 of each panel 120*a*, 120*b* is preferably tubular and is pivotally coupled to front wall 82 by hinges 122*a*, 122*b*, respectively.

End portion 128 of each floor panel 120*a*, 120*b* is located opposite end portion 127 and pivots between a raised position 129 and a lowered position 130 (shown by dashed lines). In the raised position 129, end portion 128 of either or both floor panels 120*a*, 120*b* is releasably supported by hook latch support cross tube 124 and hook latches 126*a*, 126*b*. Hinges 122*a* and 122*b* (shown in FIG. 2) extend through and engage the end portion 127 of each floor panel 120*a*, 120*b*. Hinges 122*a*, 122*b* permit floor panels 120*a*, 120*b* to be vertically moved or pivoted so as to increase the volume of compartments 107*a*, 107*b*, respectively, in communication with discharge opening 106. In embodiments where storage body 18 includes curved or bowed outward sidewalls 86, hinges 122*a*, 122*b* are preferably slanted downward from the center so that floor panels 120*a*, 120*b* fall to floor 80 with adequate clearance. Consequently, floor panels 120*a*, 120*b* are also slightly slanted downward from the center of storage body 18. In addition, because floor panels 120*a*, 120*b* are vertically movable, movable bulkheads 92*a*, 92*b*, once positioned, may be left in position and do not need to be taken out or moved to discharge commodities from compartments 107*a*, 107*b*. Because the volume of compartments 107*a*, 107*b* in communication with discharge opening 106 may be increased, waste and recyclable commodities within compartments 107*a*, 107*b* are less compacted and are easier to unload. Because the resulting flow path between upper and lower compartments does not narrow, commodities do not become more compacted as they fall into the lower compartment. Moreover, because the entire floor may be vertically moved to some extent, there are no horizontal portions or corners to prevent commodities from falling into lower compartments and to prevent the commodities from being completely unloaded out of the upper compartments. As can be appreciated, other mechanisms may alternatively be provided for vertically raising and lowering floor panels 120*a*, 120*b*. For example, rather than relying upon the force of gravity, floor panels 120*a*, 120*b* could be mechanically, hydraulically or pneumatically raised and lowered about hinges 122*a*, 122*b* or by raising and lowering the entire floor panels 120*a*, 120*b* so that both opposing sides of the floor panels are lowered while being guided within channels or grooves provided on the side walls 86 and dividing wall 90. In addition, the location of hinges 122*a*, 122*b* may be varied. For example, floor panels 120*a*, 120*b* alternatively may be hinged to side walls 86 such that floor panels 120*a*, 120*b* fall or drop to positions adjacent and parallel to side walls 86.

Hook latch support cross tube 124 extends between side walls 86 and provides a support structure for supporting hook latches 126*a*, 126*b* and ultimately end portions 128 of floor panels 120*a*, 120*b*.

Hook latches 126*a*, 126*b* (shown in FIG. 2) are pivotally coupled to the lower end of support cross tube 124. Each hook latch 126*a*, 126*b* includes at least a pair of latches or hooks 132 for engaging tubular ends 128 of floor panels 120*a*, 120*b*. Hooks 132 support floor panels 120*a*, 120*b* in a raised position so that compartments 107*a*, 107*b* are separated from compartment 107*c*. Once 107*c* is emptied, hooks 132 may be rotated (clockwise as seen in FIG. 4) to release either or both floor panels 120*a*, 120*b* so that end portion 128 of the released floor panel drops to the lowered position 130 (shown by dashed lines in FIG. 1) by the action of gravity for unloading commodities from the above compartment.

During unloading storage body 18 and compactor 16, the forward end of storage body 18 is lifted so as to tip storage body 18. As a result, tubular end 128 of either or both floor panels 120*a*, 120*b* pivot about hinges 122*a*, 122*b* away from floor 80 and towards hooks 132. When storage body 18 is tipped into a vertical or near vertical position, tubular end 128 of either or both floor panels 120*a*, 120*b* naturally repositions itself adjacent hooks 132 by the action of gravity. Thus, repositioning floor panels 120*a*, 120*b* simply requires that hooks 132 be rotated counterclockwise so as to re-engage tubular ends 130 of floor panels 120*a*, 120*b*. Once storage body 18 is lowered into a normal horizontal position, hooks 132 once again support floor panels 120*a*, 120*b*. Consequently, expensive and space consuming hydraulic or pneumatic lifting mechanisms are not necessary to reposition floor panels 120*a*, 120*b* in a raised position.

As shown by FIG. 2, compartments 34*a*, 34*b* and 34*c* of loading bin 14 are each positioned so as to unload or dump into compactor chutes 64*a*, 64*b* and 64*c*, respectively, when bin 14 is lifted above compactor 16 by lifting apparatus 15.

Arms or forks 40*a* and 40*b* are pivotally connected or hinged from compactor 16 by lugs 150 and bolts 152 at a first end of forks 40*a*, 40*b*. The opposite, second end of forks 40*a*, 40*b* are spaced apart from one another as to engage lifting lugs 32*a*, 32*b* of loading bin 14. Once engaged to loading bin 14, lifting apparatus 15 is hydraulically or pneumatically actuated to lift loading bin 14 above compactor 16 to empty commodities into compactor 16.

As best shown in FIG. 2, upper compactor chutes 64*a* and 64*b* open into upper compartments 107*a* and 107*b*, respectively, through openings 68*a*, 98*a* and 68*b*, 98*b*. Rams 72*a* and 72*b* are accordingly positioned for pressing or compacting commodities dumped from compartments 30*a*, 30*b* within loading bin 14 through chutes 76*a*, 76*b* into compartments 107*a* and 107*b* within storage body 18.

FIGS. 3 and 4 illustrate movable bulkheads 92*a*, 92*b* and drop floor assemblies 94*a*, 94*b* in much greater detail. As shown by FIG. 3, side walls 86 include holes or detents 156, 158. Detents 156, 158 are spaced in direct alignment with corresponding positioning detents 106, 108, respectively, within dividing wall 90 so that movable bulkheads 92*a*, 92*b* may be securely, but releasably, bolted in a selected position with positioning members 110 at various locations along and between side walls 86 and divider wall 90 to adjust the volume of each of the two upper compartments.

Positioning members 110 are located at each of four corners of movable bulkheads 92*a* and 92*b* and include guides 160 and positioning bolts 162. Guides 160 are preferably cylindrical tubes fixedly mounted at each of the four corners of each movable bulkhead 92*a*, 92*b*. Each guide 160 has an inner diameter in alignment with an adjacent detent and is sized for receiving and carrying a positioning bolt 162. Positioning bolts 162 are slidably received within guides 160 so that one end of each bolt 162 engages a detent to secure and position the movable bulkhead. At the same time, bolts 162 may be retracted from the detent for repositioning of movable bulkheads 92*a*, 92*b*. As can be appreciated, positioning bolts 162 may alternatively be threadably received within guides 160 and may also be spring biased into engagement with corresponding detents. In addition, an interconnecting linkage or cable may also be provided between members 110 that are adjacent walls 90 and 86 to permit manual actuation of both members 110 at the same time and to allow easier adjustment of bulkheads 92*a*, 92*b*.

As further shown by FIG. 3, hook latches 126*a* and 126*b* each include a guide tube 164, latch shaft 166, lever arm 168 and lever guide and lock 170. Guide tubes 164 are fixedly secured to a lower end of latch support tube 124. Guide tubes 164 receive and guide the rotation of latch shafts 166. Latch shafts 166 are elongate cylindrical rods which extend through and rotate within guide tubes 164 and which carry hooks 132 for hooking and releasing ends 128 of floor panels 120. Preferably, latch shaft 166 projects from guide tube 164 at opposite ends of guide tube 164. Each end of latch shaft 166 which projects out from guide tube 164 carries a hook 132. Consequently each latch shaft carries two hooks 132 for engaging end portion 128 of floor panel 120. As can be appreciated, guide tubes 164 and latch shafts 166 may be modified to carry and support any desired number of hooks 132. Latch shafts 166 extend through side walls 86 and are coupled to lever arms 168.

Lever arms 168 have a first end secured to latch shafts 166 and a second opposite end engaged within lever guide and lock 170. Lever arms 168 enable latch shaft 166 and hooks 132 to be manually rotated outside of side walls 86 to latch either or both floor panels 120*a*, 120*b* in a raised position as shown or to release either or both floor panels 120*a*, 120*b* as shown by dashed lines. Alternatively, hydraulic, pneumatic or other known power mechanisms may be employed to rotate latch shaft 166 and hooks 132 for releasing and latching floor panels 120*a*, 120*b*.

Lever guide and locks 170*a*, 170*b* are shown in detail in FIG. 5 and generally define a track for moving and guiding lever arm 158. Locks 160*a*, 160*b* further include a locking mechanism (not shown) for locking lever arm 168 in a secured position whereby hook 132 is also locked in the selected position to prevent hook 132 from rotating and accidentally releasing floor panel 120.

FIG. 4 shows an enlarged fragmentary cross-sectional view of a portion of drop floor assembly 94*b* and movable bulkhead 92*b*. As shown by FIG. 4, movable bulkhead 92*b*, as well as movable bulkhead 92*a* (not shown), include a rectangular frame 172 formed by rectangular metal tubing, and plate 174, which carry guides 160 and positioning bolts 162. Plate 174 is preferably formed from eleven gauge sheet steel and is preferably welded to edges of rectangular frame 172. Frame 172 provides a rigid structure for supporting plate 174 which contains recyclable and waste commodities within compartments 107*a*, 107*b*. As discussed above, positioning bolts 162 are carried and guided by guides 160. Bolts 162 extend through frame 172 and engage positioning holes 156, 158 in side walls 86 as well as positioning detents 106, 108 in divider wall 90 (as shown in FIG. 3). Positioning bolts 162 may be disengaged from the positioning detents 106, 108, 156, 158 and reengaged in an adjacent positioning hole to reposition the movable bulkhead. Accordingly, movable bulkheads 92*a* and 92*b* are spaced from roof 84 and floor panels 120 to enable the movable bulkheads 92 to be walked longitudinally between side walls 86 and wall 90 as explained later with respect to FIG. 6.

FIG. 4 also shows drop floor assembly 94*b* in greater detail. As best shown in FIG. 4, guide tube 164 is preferably welded to a lower surface of hook latch support cross tube 124. Guide tube 164 is a hollow tubular member which has an inner diameter sized for receiving and guiding latch shaft 166. Latch shaft 166 is rotatably disposed within guide tube 164 so that latch shaft 166 is ultimately supported by support cross tube 124. Portions of latch shaft 166 extend out from guide tube 164 and carry hooks 132. Hooks 132 engage end portion 128 of floor panels 120 to releasably support floor panels 120 in a generally horizontal orientation below movable bulkheads 92. As shown by dashed lines 179, latch shaft 166 may be rotated within guide tube 164 so as to rotate hook 132 out of engagement with end portion 128 of floor panel 120*b*. Consequently, floor panel 120*b* is released and is permitted to fall due to force of gravity. Once commodities are unloaded from compartment 107*b*, floor panel 120*b* may once again be relatched by hook 132 in its original position.

FIG. 5 is a side elevational view of a portion of storage body 18 illustrating lever guide and lock 170*a*. For ease of illustration, only lever guide and lock 170*a* is shown in detail since lever guide and lock 170*b* is identical to lever guide and lock 170*a*. Lever guide and lock 170*a* includes guard 180, quick release pin 182, angle bracket 184, and spring 186. Guard 180 is a pair of spaced apart generally flat elongate bars having ends fixedly secured to side wall 86. Guard 180 provides a channel or track between guide 180 and side wall 86 for guiding movement of lever arm 168. Guard 180 is preferably secured to side wall 86 so as to partially surround a lower end of lever arm 168. Guide 180 further defines a pair of aligned apertures 188 which extend through both spaced apart bars forming guard 180. Apertures 188 are sized for receiving quick release pin 182. Quick release pin 182 is conventionally known and is received within apertures 188 to prevent movement of lever arm 168 within the track defined by guard 180. As a result, hooks 132 of hook latches 126*a* are also secured in position and cannot be rotated. Manual release of release pin 188 permits movement of lever arm 168 and rotation of hooks 132 to release floor panel 120*a*.

Angle bracket 184 is fixedly secured to side wall 86 and captures a first end of spring 186. The second end of spring 186 is coupled to lever arm 168. Spring 186 biases lever arm 168 in a first position whereby hook 132 is engaged with floor panel 120*a* (not shown). As a result, accidental release of floor panel 120*a* is prevented by both the biasing force of spring 186 and release pin 188. At the same time, removal of release pin 188 permits lever arm 186 to be moved against the biasing force of spring 186 to release floor panel 120*a* (not shown).

FIG. 6 illustrates in greater detail the lengthwise adjusting or walking of bulkheads 92 between the front and rear of storage body 18 to adjust the volume of compartments 107*a*, 107*b*. For ease of illustration, FIG. 6 shows repositioning of movable bulkhead 92*b* to adjust the volume of compartment 107*b*. As can be appreciated, repositioning of movable bulkhead 92*a* to adjust the volume of 107*a* is accomplished similarly. As shown by FIG. 6, the row of detents 156 and the row of detents 158 in side walls 86 are offset from one another by one-half the distance separating adjacent detents of either row 156 or 158. In the preferred embodiment, each detent 156 is spaced from an adjacent detent 156 by about 6 inches. Each detent 158 is spaced from an adjacent detent 158 by about 6 inches. Accordingly, the row of detents 156 and 158 are offset by about 3 inches from one another so that each detent 158 is positioned between adjacent detents 156. The row of detents 156 longitudinally extends just below roof 84. The row of detents 158 longitudinally extends just above the horizontal position of floor panel 120*b*. Movable bulkhead 92*b* has a top edge spaced from roof 84 and a bottom edge spaced above floor panel 120*b* so that movable bulkhead 92*b* may be pivoted about detents 156 and 158 as shown in FIG. 6.

As shown by dashed lines, movable bulkhead 92*b* is repositioned to increase the volume of compartment 107*b* by pivoting the lower end of bulkhead 92*b* about detent 156*a* as indicated by arrow A. Next, positioning bolt 162 adjacent the lower end of movable bulkhead 92*b* is positioned so as to engage detent 158*b* and positioning bolt 162 adjacent the top end of the movable bulkhead 92*b* is disengaged from detent 156*a* to enable the top end of movable bulkhead 92*b* to be pivoted about detent 158B and pivoted as shown by arrow B. This procedure may be repeated as necessary to reposition movable bulkhead 92*b* in a desired position and to selectively adjust the volume of compartment 107*b*. Movable bulkhead 92*b* is positioned manually without complex guiding or alignment mechanisms. Thus, it is easy to reposition bulkhead 92*b* without bulkhead 92*b* becoming jammed or bound within guiding structures. Furthermore, because tolerance concerns are eliminated with respect to bulkhead 92*b*, manufacture is less costly.

Figure 7:
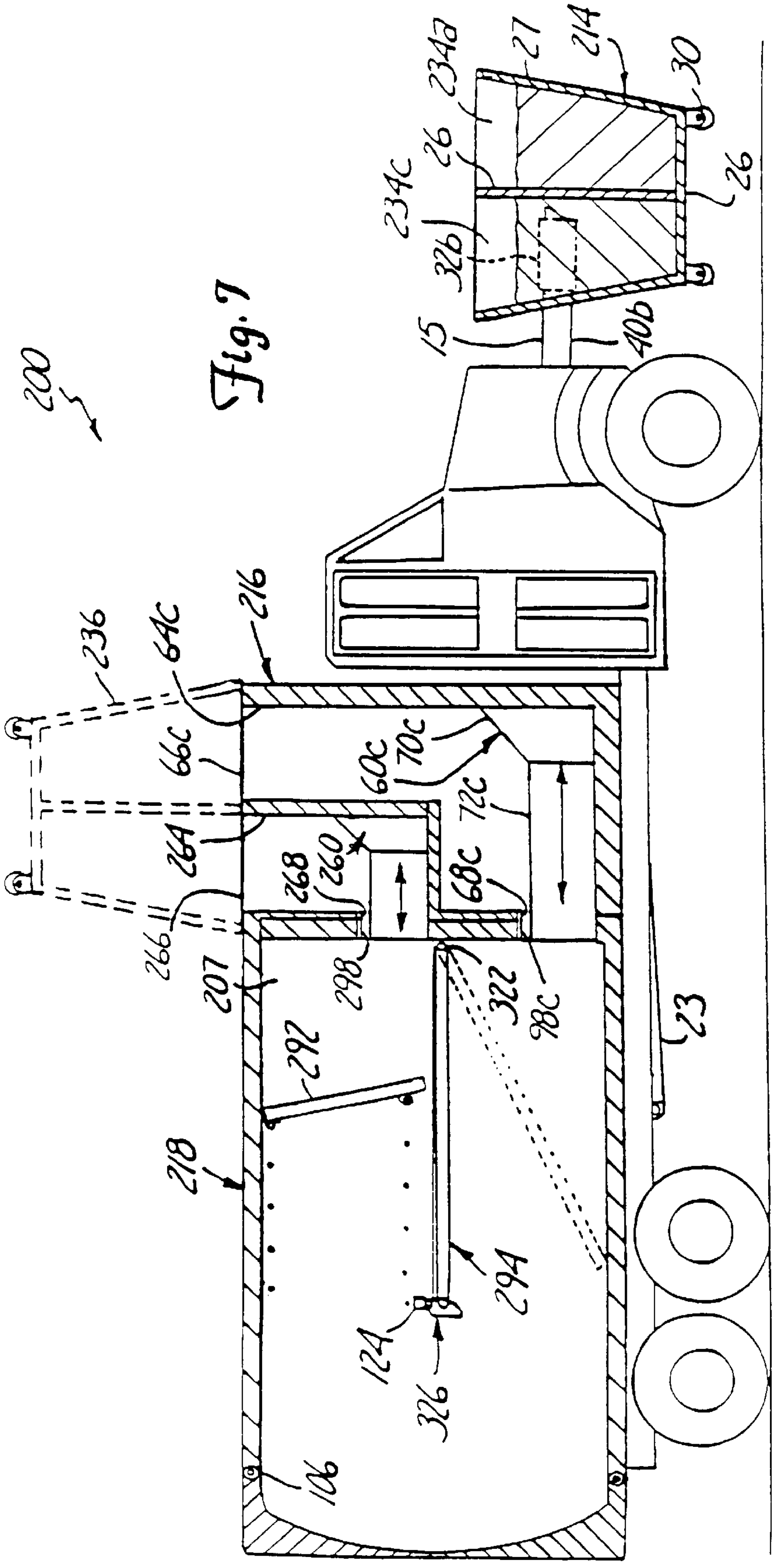
FIG. 7 is a side elevational view of an alternate embodiment of the inventive refuse collection vehicle, with portions shown in section.
Figure 8:
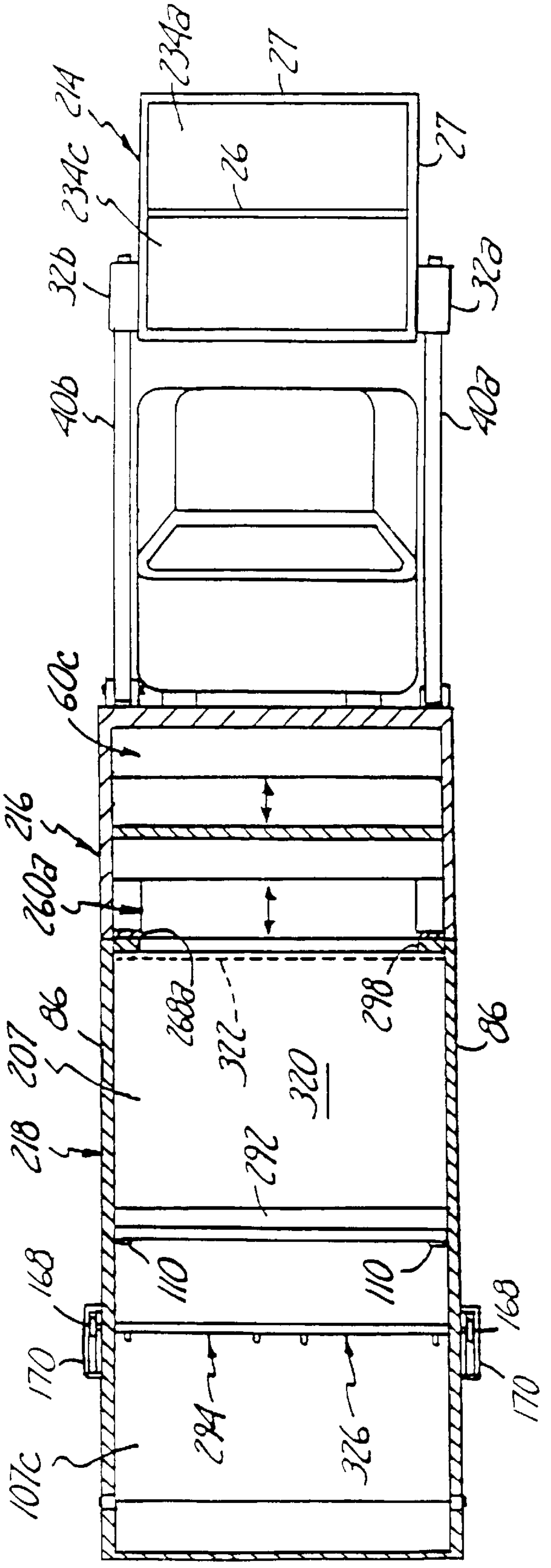
FIG. 8 is a top view of the refuse collection vehicle of FIG. 7, with portions shown in section.

FIGS. 7 and 8 illustrate an alternate embodiment (vehicle 200) of refuse collection vehicle 10 shown in FIGS. 1–6. FIGS. 7 and 8 illustrate a two compartment refuse collection vehicle 200. FIG. 7 shows a side sectional view of vehicle 200 while FIG. 8 shows a top sectional view of vehicle 200. Those elements of collection vehicle 200 which are the same as corresponding elements of collection vehicle 10 are numbered similarly. Refuse collection vehicle 200 is similar to refuse collection vehicle 10 except that loading bin 14 is replaced by loading bin 214, compactor 16 is replaced with compactor 216 and storage body 18 is replaced with storage body 218. Loading bin 214 is similar to loading bin 14 except that divider wall 29 of loading bin 214 is omitted. As a result, divider wall 26 divides the interior volume of loading bin 214 into front compartment 234*a* and rear compartment 234*c*. Each compartment may be used to carry refuse and recyclable commodities which must be separated. As can be appreciated, loading bin 214 may alternatively have a multitude of different configurations for containing several different commodities requiring separation. As shown by dashed lines 236, loading bin 214 is lifted by lifting apparatus 15 and emptied into compactor 216.

Compactor 216 is similar to compactor 16 of refuse collection vehicle 10 except that compactor 216 omits wall 58 and thereby includes only two distinct chutes 264 and 264. In addition, ram assemblies 60*a* and 60*b* of refuse collection vehicle 10 are replaced with ram assembly 260 and openings 66*a*, 66*b* and 68*a*, 68*b* are replaced with openings 266 and 268, respectively. Opening 266 extends between opposing side walls 86 (shown in FIG. 8). Similarly, opening 268 extends between opposing side walls 86 near a lower end of chute 264*a*. Ram assembly 260 is similar to ram assembly 60*a* except that ram assembly 260*a* extends between opposing side walls 86 as shown in FIG. 8. As a result, opening 266 and chute 264 provide a larger area through which material may be unloaded into compactors 16 from compartment 234*a* of loading bin 214. Commodities may then be pushed and compacted through opening 268*a* into an upper end of storage body 218. Chute 64*c* receives commodities from compartment 234*c*. Ram assembly 60*c* pushes and compacts commodities through opening 68*c* into storage body 218.

Storage body 218 is similar to storage body 18 except that storage body 218 includes a single opening 298 in lieu of side-by-side openings 98*a* and 98*b* in storage body 18. Storage body 218 also differs from storage body 18 in that storage body 218 does not include divider wall 90 and includes a single moveable bulkhead 292 and a single drop floor assembly 294.

Opening 298 extends substantially across storage body 218 between side walls 86 and is in communication with opening 268 of compactor 216. Opening 298 preferably is positioned above drop floor assembly 294 so that compactor 260 compacts material through openings 268 and 298 onto drop floor assembly 294.

Moveable bulkhead 292 is similar to moveable bulkheads 92*a* and 92*b* except that moveable bulkhead 292 extends substantially across storage body 218 between side walls 86. Positioning members 110 of moveable bulkhead 292 engage opposing side walls 86 of storage body 218 to releasably position moveable bulkhead 292 along storage body 218. Moveable bulkhead 292 is adjustable or walkable between the front and rear of storage body 218 similar to the adjusting of moveable bulkheads 92*a* and 92*b* as shown in FIG. 6. Consequently, moveable bulkhead 292 permits the volume of upper compartment 207 to be adjusted for containing various amounts of refuse and recyclable commodities.

As can be appreciated, movable bulk head 292 may alternatively be pivotably supported across storage body 218 so that a lower end of bulk head 292 may be pivoted so as to vertically adjust a distance or vertical length between the lower end of bulk head 292 and roof 84. With the provision of means for selectively securing the lower end of bulk head 292 at a variety of distances below roof 84, floor panel 320 may also be supported at a corresponding variety of distances below roof 84. Preferably, drop floor assembly 294 would include means for supporting floor panel 320 at a corresponding variety of distances below roof 84.

Drop floor assembly 294 is similar to drop floor assemblies 94*a* and 94*b* except that drop floor assembly 294 includes a single floor panel 320, a single hinge 322 and a single hook latch 326. Floor panel 320 is similar to floor panels 120*a* and 120*b* except that floor panel 320 extends substantially between side walls 86 to provide a single intermediate floor. Hinge 322 is similar to hinges 122*a* and 122*b* except that hinge 322 extends substantially between side walls 86. Similarly, hook latch 326 is similar to hook latches 126*a* and 126*b* except that hook latch 326 extends substantially between side walls 86. Hook latch 326 preferably includes four hooks instead of two for more stably supporting floor panel 320. Hook latch 326 also includes two lever arms 168 and two lever guide and locks 170, each lever arm 168 and lever guide lock 170 extending through opposing side walls 86. As a result, hook latch 326 may be manually actuated for latching or releasing floor panel 320 from either side of storage body 218. Storage body 218 permits the volume of compartments 107*c* and 207 to be adjusted by moving moveable bulkhead 292 forward or rearward. Similar to storage body 18, storage body 218 allows the floor panel to be released to increase the volume of compartment 207 in communication with discharge opening 106. Consequently, refuse and recyclable commodities within compartment 207 are less compacted and are easier to unload. In addition, because floor panel 320 is vertically moveable, moveable bulkhead 292, once positioned, may be left in position and does not need to be taken out or moved to discharge commodities from compartment 207. As with drop floor assemblies 94*a* and 94*b*, drop floor assembly 294 may be dropped or released under the force of gravity and may also be raised for engagement with hook latch 326 by merely tipping or lifting storage body 218. Alternatively, floor panel 320 may be mechanically, hydraulically or pneumatically raised and lowered about hinge 322. In addition, the location of hinge 322 may also be varied. For example, floor panel 320 alternatively may be hinged to side walls 86 such that floor panel 320 falls or drops to positions adjacent and parallel to side walls 86. In lieu of hinge 322, storage body 218 may alternatively be provided with channels or grooves so that both opposing sides of floor panel 320 may be lowered while being guided within the channels or grooves.

Figure 9:
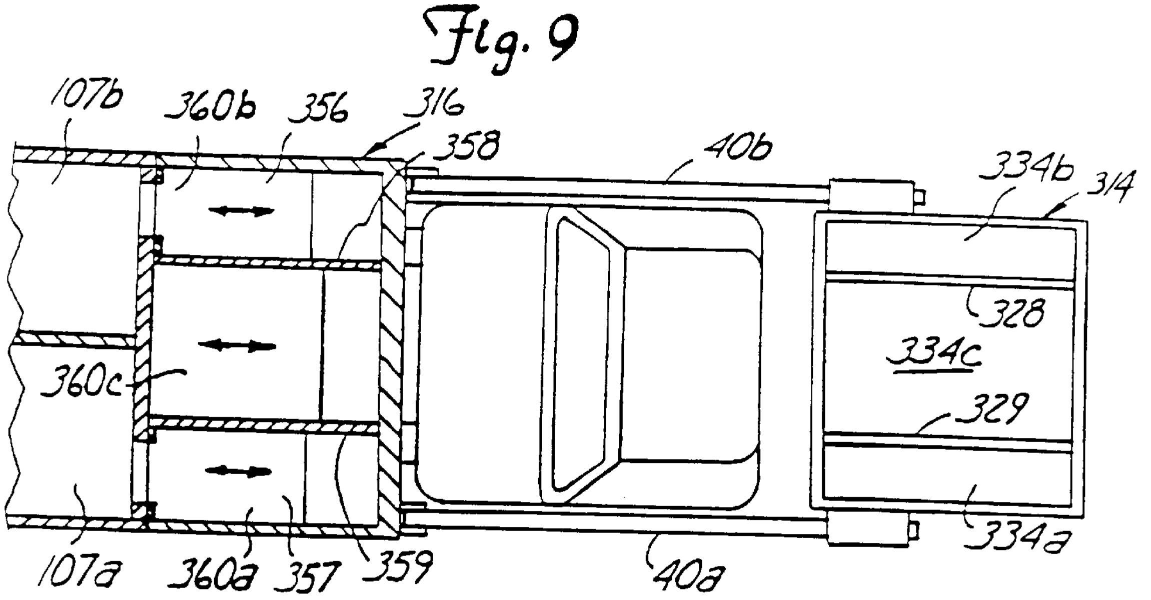
FIG. 9 is a schematic illustration of an alternate embodiment of the inventive storage body.

FIG. 9 illustrates an alternate preferred embodiment (bin 314 and compactor 316) of bin 14 and compactor 16 shown in FIGS. 1–8. Loading bin 314 is similar to bin 14 except that bin 314 includes two dividing walls 328 and 329 which define three distinct side-by-side compartments 334*a*, 334*b* and 334*c*. Each compartment 334 is sized and designed for the reception of garbage and recyclable materials which must be separated. Preferably, compartment 334*c*, which is for the reception of generally non-recyclable garbage, occupies a larger portion of bin 314. Compartments 334*a* and 334*b* divide the remainder of bin 314 for the reception of paper and glass or plastic material, respectively.

Compactor 316 is similar to compactor 16 except that compactor 316 includes upper chute floors 356, 357 and intermediate chute walls 358, 359. Chute floors 357 and 358 extend from the front of compactor 316 to the rear of compactor 316 along the sides of compactor 316. Chute walls 358, 359 vertically extend between the roof of compactor 316 to floors 356, 357, respectively. Floors 356, 357 and walls 358, 359 divide compactor 316 into three distinct side-by-side chutes, upper right chute 360*a*, upper left chute 360*b* and central lower chute 360*c*. Chutes 360*a*, 360*b* and 360*c* are preferably in alignment with compartments 334*a*, 334*b* and 334*c*, respectively, of bin 314. As a result, separated garbage within compartments 334 of loading bin 314 may be emptied into the separate chutes 360 of compactor 316 without the materials commingling with one another. Similar to compactor 16, materials within chutes 360*a*, 360*b* and 360*c* are compacted into compartments 107*a*, 107*b* and 107*c* of storage body 18.

Figure 10:
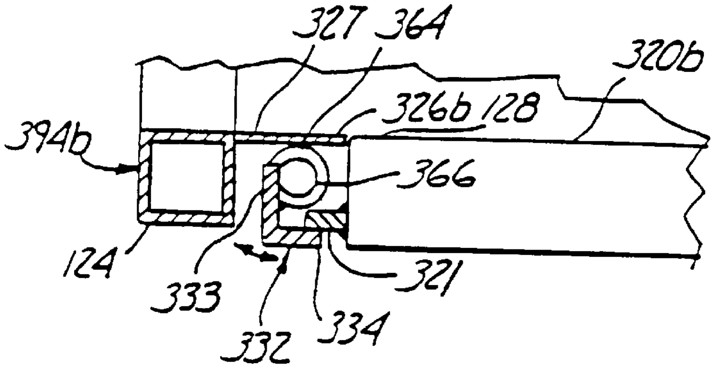
FIG. 10 is a schematic illustration of an alternate embodiment of the inventive storage body.

FIG. 10 illustrates an alternative embodiment (drop floor assembly 394*b*) of drop floor assembly 94*b* shown in FIG. 4. For ease of illustration, those elements of drop floor assembly 394*b* which are the same as those elements of drop floor assembly 94*b* are numbered the same. Drop floor assembly 394*b* includes floor panel 320*b* and hook latch 326*b*. Floor panel 320*b* is similar to floor panel 120*b* except that end portion 128 of floor panel 320*b* includes lip member 321. Lip member 321 preferably comprises a steel bar welded to a lower end of end portion 128. Lip 321 protrudes from end portion 128 for being engaged by hook latch 326*b*.

Hook latch 326*b* is similar to hook latch 126*b* except that hook latch 326*b* includes cover plate 327, guide tube 364, latch shaft 366 and hooks 332. Cover plate 327 is a flat steel bar preferably welded to support tube 124 so as to horizontally project away from support tube 124 towards floor panel 320*b*. Preferably, cover plate 327 extends into close tolerance with floor panel 320*b* at substantially the same horizontal level as the upper surface of floor panel 320*b*. Cover plate 327 supports guide tube 364, latch shaft 366 and hooks 332. Cover plate 327 prevents commodities or refuse from being deposited upon and building up on hooks 332 which would otherwise interfere with the functioning of hook latch 326*b*. At the same time, cover plate 327 does not interfere with commodities from being moved across tube 124 onto floor panel 320*b* when the movable bulkhead is slid forward.

Guide tube 364 is similar to guide tube 164 shown in FIG. 4. Guide tube 364 is fixedly coupled to a lower surface of cover plate 327. Guide tube 364 supports latch shaft 366 and guides the rotation of latch shaft 366. Latch shaft 366 is substantially similar to latch shaft 166 shown in FIG. 4. Latch shaft 366 extends through guide tube 364 and rotatably supports hook 332.

Each hook 332 generally comprises an L-shaped member having a substantially vertical portion 333 and a substantially horizontal portion 334. Vertical portion 333 is mounted to latch shaft 366 while horizontal portion 334 horizontally extends from vertical portion 333 towards floor panel 320*b*. Horizontal portion 334 has a width so as to engage lip member 321 of floor panel 320*b*. As a result, rotation of latch shaft 366 rotates horizontal portion 334 of each hook 332 in and out of engagement with lip 321 of floor panel 320*b* to support floor panel 320*b* in a raised position or to permit floor panel 320*b* to be lowered. Moreover, because hooks 332 are formed from L-shaped members, hooks 332 more easily engage floor panel 320*b*.

Figure 11:
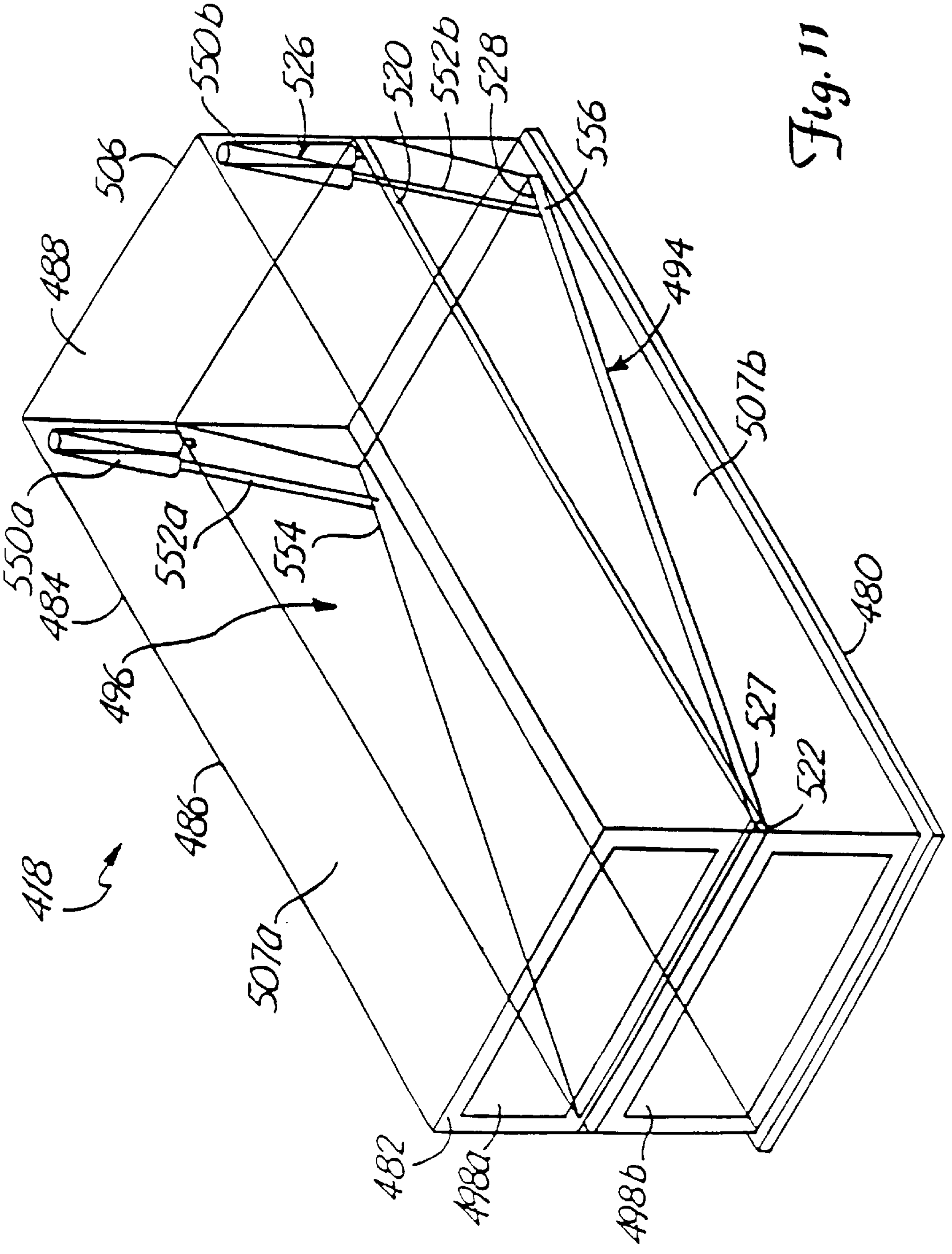
FIG. 11 is a schematic illustration of an alternate embodiment of the inventive storage body.

FIGS. 11–14 schematically illustrate alternative embodiments of storage body 18. For ease of illustration, those elements in FIGS. 11–14 which are the same are numbered similarly. FIG. 11 shows a schematic view of storage body 418, which is designed for being mounted upon a frame adjacent to a compactor and includes floor 480, front wall 482, roof 484, side wall 486, tail gate assembly 488 and drop floor assembly 494. Floor 480, front wall 482, roof 484, side wall 486 and tail gate assembly 488 define interior storage space 496. Front wall 482 includes openings 498*a* and 498*b*. Openings 498*a* and 498*b* are positioned for receiving refuse and recyclable commodities from a compactor (not shown). Tail gate assembly 488 encloses the rear portion of interior storage space 496 to retain waste and recyclable commodities within interior storage space 496. Tail gate assembly 488 further defines a discharge opening 506 through which commodities may be emptied from interior storage space 496. Drop floor assembly 494 includes floor panel 520, hinge 522, and lifting mechanism 526. Floor panel 496 extends between side walls 486 from front wall 482 to the rear wall or tail gate assembly 488. Floor panel 520 divides interior storage space 496 into an upper compartment 507*a* and a lower compartment 507*b*. Floor panel 520 has opposing end portions 527 and 528 and opposing end portions 554, 556. Opposing end portion 527 is preferably hinged to front wall 482 by hinge 522. Opposing end portion 528 is preferably coupled to lifting mechanism 526.

Lifting mechanism 526 is preferably a hydraulic or pneumatic piston cylinder assembly and includes cylinder assemblies 550*a*, 550*b* and a pistons 552*a*, 552*b*. Cylinder assemblies 550*a*, 550*b* are coupled to side walls 486. Pistons 552*a*, 552*b* extend from cylinder assemblies 550*a*, 550*b* and are coupled to end portions 554, 556, respectively, of floor panel 494 near end portion 528. Actuation of pistons 552 raises and lowers floor panel 494 to decrease or increase the volume of compartment 507*a* in communication with discharge opening 506. As a result, refuse and commodities within compartment 507 are less compacted and are easier to unload. Moreover, because floor panel 494 extends from wall 482 to the rear wall or tail gate assembly 488, compartment 507*a* has a larger volume for containing selected commodities. As can be appreciated, lifting mechanism 526 may alternatively comprise hook latches as shown in FIGS. 1 and 2.

Figure 12:
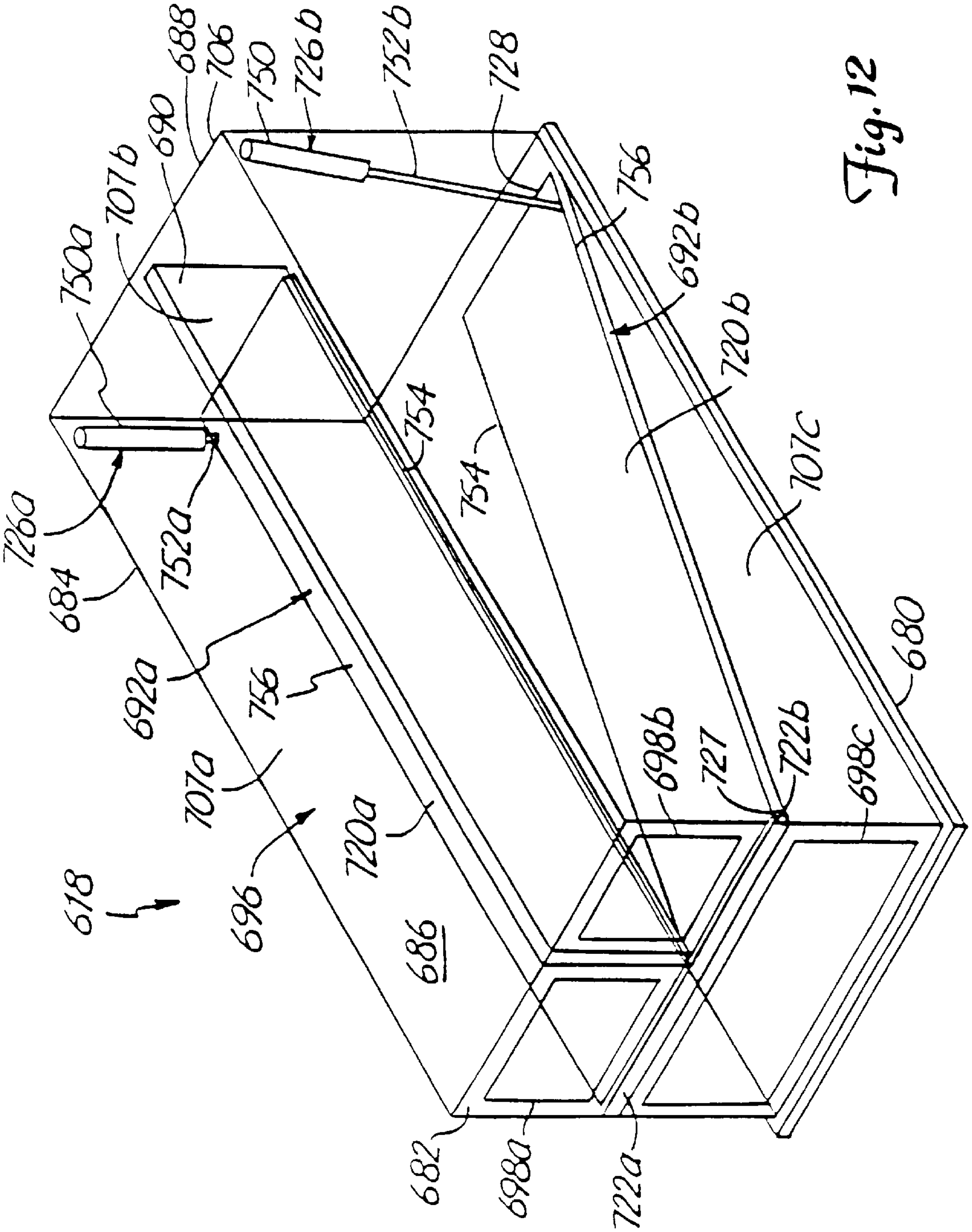
FIG. 12 is a schematic illustration of an alternate embodiment of the inventive storage body.

FIG. 12 shows a schematic view of storage body 618, which is designed for being mounted upon a frame adjacent to a compactor and includes floor 680, front wall 682, roof 684, side walls 686, tail gate assembly 688, intermediate dividing wall 690 and drop floor assemblies 692*a* and 692*b*. Floor 680, front wall 682, roof 684, side walls 686 and tail gate assembly 688 define an interior storage space 696 of storage body 618. Front wall 682 includes opening 698*a*, opening 698*b* and lower opening 698*c*. Openings 698*a*, 698*b* and 698*c* are in communication with a compactor (not shown) so that storage body 618 may receive refuse and recycled commodities through openings 698. Preferably, openings 698 are aligned with openings within the compactor so that ram assemblies (not shown) may push and compact waste and recyclables through openings 698 into interior storage space 696. Tail gate assembly 688 serves as a rear wall for enclosing the rear portion of interior storage space 696 to retain refuse and recyclable commodities within storage body 618. Tail gate assembly 688 is preferably openable so as to define a discharge opening 706 through which commodities may be emptied from interior storage space 696.

Intermediate dividing wall 690 extends downward from roof 684 and rearward from front wall 682 to divide upper portions of storage space 696 into left and right halves. Dividing wall 690 preferably extends from front wall 682 to tail gate assembly 688 where discharge opening 706 is defined. Intermediate dividing wall 690, and drop floor assemblies 694*a* and 694*b* divide storage space 696 into three separate and distinct compartments 707*a*, 707*b* and 707*c*. As a result, each compartment may be used to contain and separate different commodities. Dividing wall 690 is preferably positioned between openings 698*a* and 698*b*.

Drop floor assemblies 692*a* and 692*b* are preferably positioned on opposite sides of divider wall 690 and include floor panels 720*a*, 720*b*, hinges 722*a*, 722*b* and lifting mechanisms 726*a*, 726*b*. Floor panels 720*a*, 720*b* and hinges 722*a*, 722*b* are similar to floor panels 120*a*, 120*b* and hinges 122*a* and 122*b* of storage body 18 except that floor panels 720*a*, 720*b* extend from front wall 682 towards tail gate assembly 688 substantially along the entire length of storage body 618. Consequently, compartments 707*a* and 707*b* are larger and are capable of containing a larger quantity of refuse and recyclable commodities. Floor panels 720*a* and 720*b* each include opposing end portions 727, 728 and opposing end portions 754, 756. Opposing end portions 727 of each floor panel 720*a*, 720*b* is hinged to front wall 682 by hinges 722*a*, 722*b*, respectively. Opposing end portion 728 of each floor panel 720*a*, 720*b* is coupled to lifting mechanisms 726*a*, 726*b*, respectively. As a result, floor panels 720*a*, 720*b* may be pivoted about hinges 722*a*, 722*b* to be vertically moved so as to increase volume of compartments 707*a*, 707*b* in communication with discharge opening 706.

Lifting mechanisms 726*a*, 726*b* are preferably hydraulic or pneumatic piston-cylinder assemblies which include cylinders 750*a*, 750*b* and pistons 752*a*, 752*b*. Cylinders 750*a*, 750*b* are preferably coupled to side walls 686 while pistons 752*a*, 752*b* are coupled to end portions 756 near end portion 728. Selective actuation of pistons 752 permits floor panels 720*a*, 720*b* to be raised and lowered. As can be appreciated, lifting mechanism 726*a*, 726*b* may alternatively include hook latches 126 of storage body 18. Because the volume of compartment 707*a*, 707*b* in communication with discharge opening 706 may be increased, refuse and recyclable commodities within compartment 707*a*, 707*b* are less compacted and are easier to unload. Storage body 618 provides three distinct separate compartments wherein the upper compartments have a larger capacity for adequately storing and containing refuse.

Figure 13:
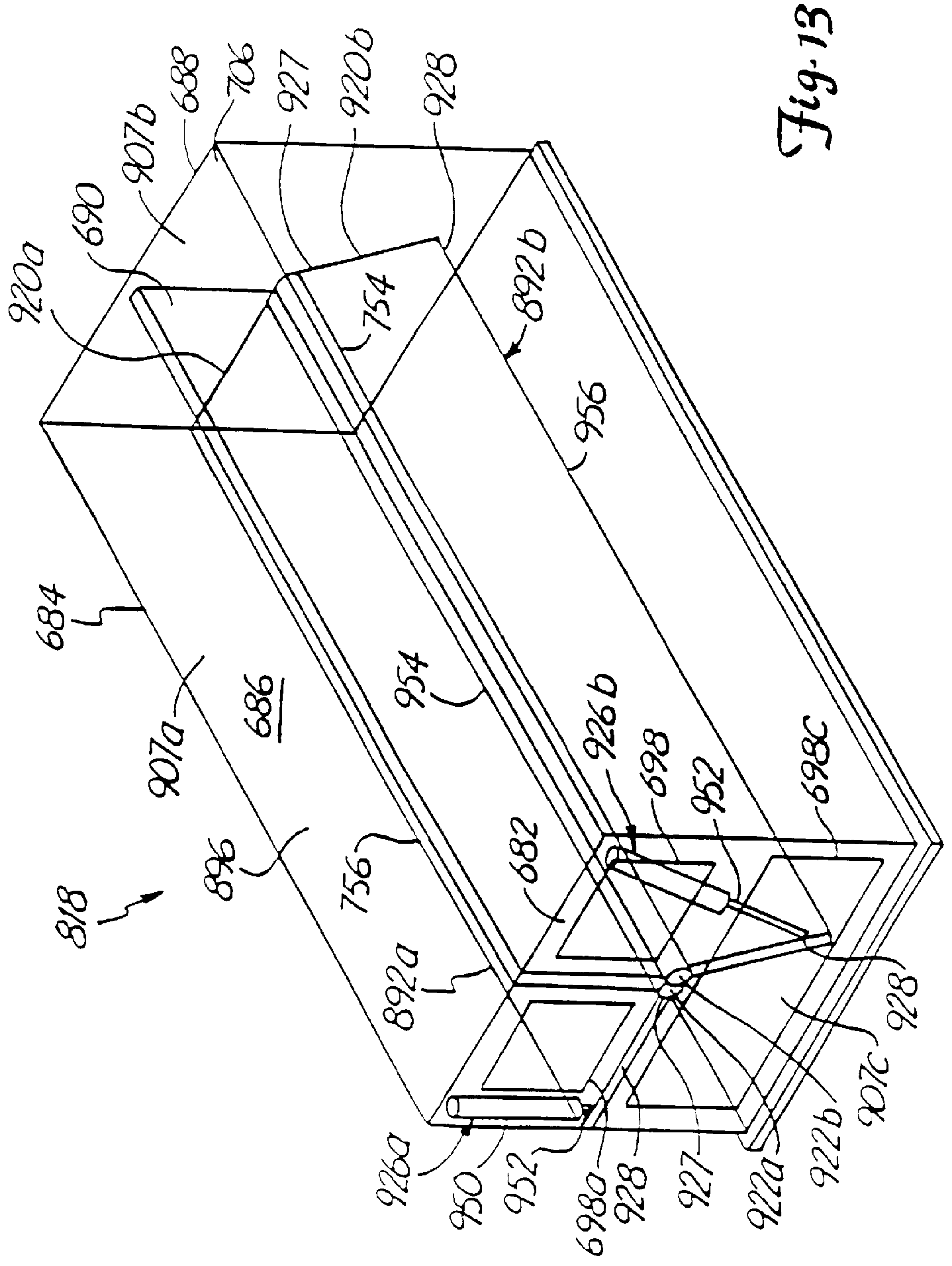
FIG. 13 is a schematic illustration of an alternate embodiment of the inventive storage body.

FIG. 13 schematically illustrates an alternate embodiment (storage body 818) of storage body 618 shown in FIG. 12. For ease of illustration, those elements of storage body 618 which are the same as corresponding elements of storage body 618 are numbered similarly. Storage body 818 is similar to storage body 618 except that storage body 818 includes drop floor assembly 892*a*, 892*b* in place of drop floor assemblies 692*a*, 692*b*, respectively. Drop floor assembly 892*a*, 892*b* are preferably positioned on opposite sides of divider wall 690 and include floor panels 920*a*, 920*b*, hinges 922*a*, 922*b* and lifting mechanisms 926*a*, 926*b*. Floor panels 920*a*, 920*b* include opposing end portions 927 and 928 and opposing end portions 954, 956. End portion 954 of each panel 920*a*, 920*b* is pivotally coupled to intermediate wall 690 by hinges 922*a*, 922*b*, respectively. End portion 956 of each floor panel 920*a*, 920*b* is located opposite end portion 954 and pivots between a raised position and a lowered position. As shown in FIG. 13, floor panel 920*a* is in a raised position while floor 920*b* is in a lowered position. In a raised position, floor panels 920*a*, 920*b* and intermediate wall 690 divide interior storage space 996 into three distinct compartments 907*a*, 907*b* and 907*c*. When both floor panels 920*a*, 920*b* are lowered, interior storage space 896 is divided into two compartments, a left compartment and a right compartment. Consequently, storage body 818 may be used to provide both a three compartment storage body or a two compartment storage body. Moreover, because floor panels 920*a*, 920*b* are both vertically adjustable, the volume of compartments 907*a*, 907*b* in communication with discharge opening 706 may be increased so that waste and recyclable commodities within the compartments are less compacted and are easier to unload. Because floor panels 920*a*, 920*b* extend from front wall 682 towards tail gate assembly 688 substantially along the entire length of storage body 818, the capacity or volume of compartments 907*a*, 907*b* is large enough to receive a substantial amount of refuse or recyclable commodities.

Lifting mechanisms 926*a*, 926*b* are identical to lifting mechanisms 926*a*, 926*b* shown in FIG. 12 and include cylinder assemblies 950*a*, 950*b* and in pistons 952*a*, 952*b*. Each cylinder assembly 950*a*, 950*b* is preferably coupled to front wall 682. Alternatively, cylinder assemblies 950*a*, 950*b* may be coupled to side walls 686. Each piston 952 extends from cylinder assembly 850 and has one end coupled to end portion 956 near end portion 928 of floor panels 920*a*, 920*b*. Hydraulic or pneumatic actuation of piston 952 raises and lowers floor panel 920*a*, 920*b* as desired. Alternatively, lifting mechanisms 926*a*, 926*b* may include hook latches 126*a*, 126*b* as shown in FIGS. 1–6.

Figure 14:
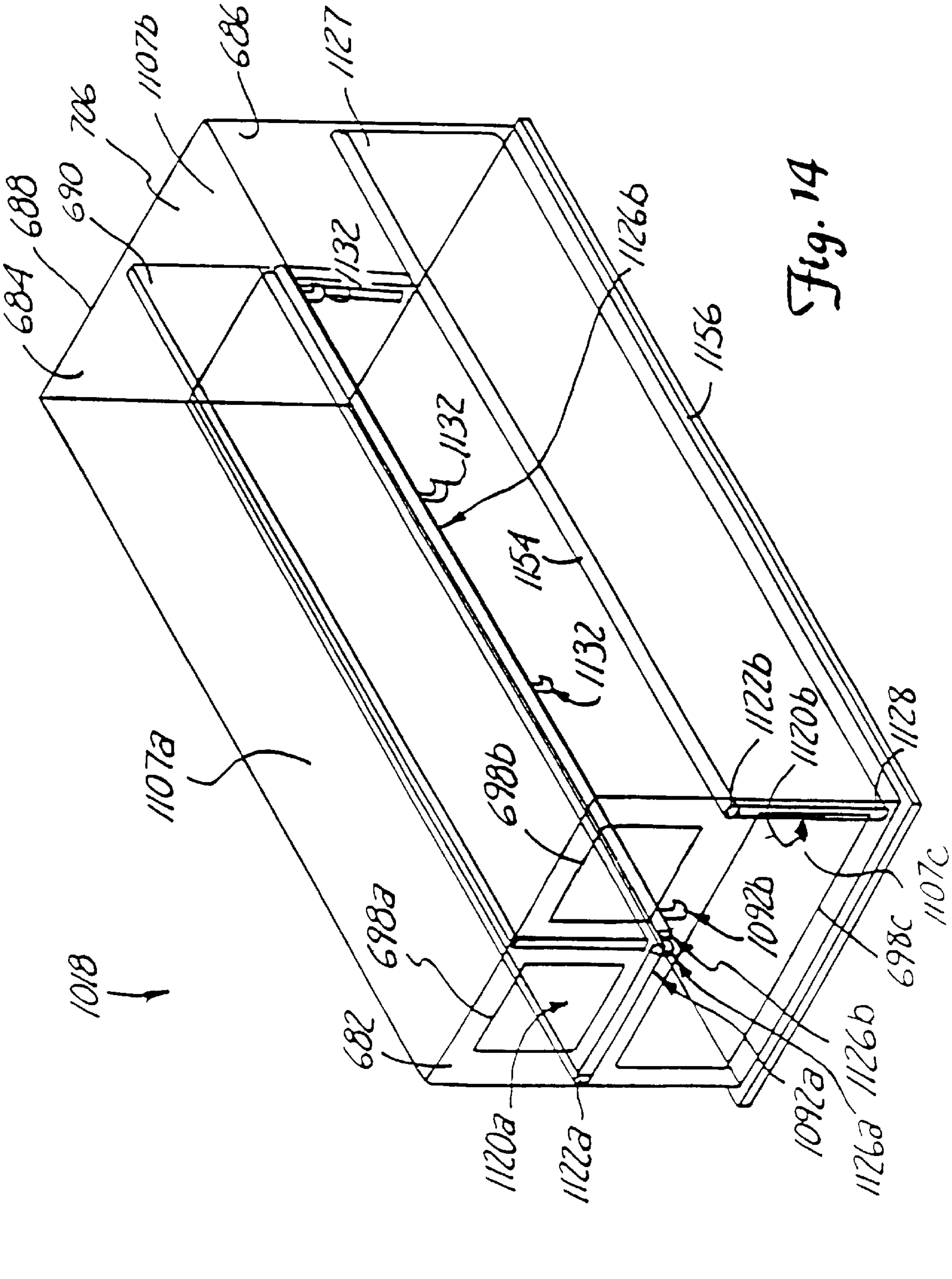
FIG. 14 is a schematic illustration of an alternate embodiment of the inventive storage body.

FIG. 14 schematically shows another alternate embodiment (storage body 1018) of storage body 618 shown in FIG. 12. For ease of illustration, those elements of storage body 1018 which are the same as those elements of storage body 618 are numbered similarly. Storage body 1018 is similar to storage body 618 except that storage body 1018 includes drop floor assemblies 1092*a*, 1092*b* in place of drop floor assemblies 692*a*, 692*b*. Drop floor assemblies 1092*a*, 1092*b* include floor panels 1120*a*, 1120*b*, hinges 1122*a*, 1122*b* and hook latches 1126*a*, 1126*b*. Floor panels 1120*a*, 1120*b* each include opposing end portions 1127, 1128 and opposing end portions 1154, 1156. End portion 1154 of each floor panel 1120*a*, 1120*b* is pivotally coupled to side wall 686 by hinges 1122*a*, 1122*b*, respectively. As a result, end portion 1156 may be raised and lowered. In a raised position, each floor panel 1120*a*, 1120*b* divides interior storage space 1096 into three compartments 1107*a*, 1107*b*, and 1107*c*. In a lowered position, end portion 1156 is positioned adjacent side walls 686. Consequently, when both floor panels 1120*a*, 1120*b* are in a lowered position, interior storage space 1096 is a single unpartitioned compartment. Moreover, because floor panels 1120*a*, 1120*b* each preferably have a width between end portions 1154 and 1156 less than or equal to the height at which floor panels 1120*a*, 1120*b* are pivotally coupled to side walls 686, end portion 1156 may be pivoted into abutment against side walls 686 and does not substantially project into compartment 1107*c* to interfere with unloading or compaction of materials within compartment 1107*c*. In addition, lowering either one or both of floor panels 1127*a*, 1127*b* increases the volume of either or both compartments 1107*a*, 1107*b* in communication with discharge opening 706. For example, lowering floor panel 1120*b* (as shown in FIG. 12) allows refuse and recyclable commodities compacted within compartment 1107*b* to fall down into compartment 1107*c* and become less compacted. Consequently, unloading is easier.

Hook latches 1126*a*, 1126*b* are similar to hook latches 126*a*, 126*b* shown in FIGS. 1–6 except that hook latches 1126*a*, 1126*b* extend between front wall 682 and tail gate assembly 688 adjacent to divider wall 690. Preferably, each hook latch 1126*a*, 1126*b* is coupled to a lower end of divider wall 690. Similar to hook latches 126, hook latches 1126*a*, 1126*b* each include hooks 1132 which releasably engage end portions 1156 of floor panels 1120*a*, 1120*b* to hold floor panels 1120*a*, 1120*b* in a raised position. Hooks 1132 may be rotated by a lever arm (not shown) to release end portion 1156 of floor panel 1120*a*, 1120*b* to allow floor panels 1120*b* to fall due to the force of gravity into a lowered position floor panel 1120*b* is shown in a lowered position in FIG. 12. Tipping of storage body 1018 permits floor panels 1120*a*, 1120*b* to be easily rotated once again into the raised position at which point hook latches 1126*a*, 1126*b* may be once again rotated to releasably secure the floor panels in the raised position.

FIGS. 15–21 illustrate storage body 1118, an alternate embodiment of storage body 218 illustrated in FIGS. 7 and 8. Storage body 1118 is designed for being mounted upon a frame adjacent to a compactor and includes floor 1180, front wall 1182, roof 1184, side walls 1186, tailgate assembly 1188, drop floor assembly 1194 and drop floor support assembly 1195. Floor 1180, front wall 1182, roof 1184, side walls 1186 and tailgate assembly 1188 define interior storage space 1196. Front wall 1182 includes openings 1198*a* and 1198*b*. Openings 1198*a* and 1198*b* are positioned for receiving refuse and recyclable commodities from a compactor (not shown). Floor 1180, roof 1184 and side walls 1186 define discharge opening 1206. Tailgate assembly 1188 preferably comprises a bubble gate assembly as is conventionally known. Because tailgate assembly 1188 preferably comprises a bubble tailgate assembly, tailgate assembly 1188 enlarges interior storage space 1196 by additionally providing bubble compartment 1270 for the additional storage of commodities. Alternatively, tailgate assembly 1188 may comprise a single or a plurality of generally flat hinged doors for closing discharge opening 1206. Preferably, tailgate assembly 1188 is pivotally coupled to roof 1184 in a well-known conventional manner to enclose the rear portion of interior storage space 1196 and to retain waste and recyclable commodities within interior storage space 1196. Alternatively, tailgate assembly 1188 may be coupled to either side walls 1186 or floor 1180 of storage body 1118 so as to enable tailgate assembly 1188 to be opened and closed as desired. Opening of tailgate assembly 1188 permits refuse to be discharged through a discharge opening 1206 at a rear end of storage body 1118.

Drop floor assembly 1194 includes floor panel 1220, hinge 1222 and lifting mechanism 1226. Floor panel 1220 preferably extends between side walls 1186 from front wall 1182 towards discharge opening 1206 and tailgate assembly 1188. Floor panel 1220 preferably completely extends from front wall 1182 to discharge opening 1206. Alternatively, floor panel 1220 may extend from supports intermediate front wall 1182 and discharge opening 1206. Floor panel 1220 divides interior storage space 1196 into an upper compartment 1207*a* and a lower compartment 1207*b*. Floor panel 1220 has opposing end portions 1227 and 1228. Opposing end portion 1227 is preferably hinged adjacent to front wall 1182 by hinge 1222. As can be appreciated, floor panel 1220 may be pivotally coupled directly to front wall 1182 or directly to side walls 1186 so as to pivotally support floor panel 1220 adjacent to front wall 1182.

Opposing end portion 1228 pivots by means of hinge 1222 between floor 1180 and roof 1184 and includes catch 1230. Catch 1230 is preferably an angled metal bar fixedly coupled to opposing end portion 1228 and projecting from opposing end portion 1228 for engagement with drop floor support assembly 1195. Because catch 1230 is preferably a relatively flat horizontal bar projecting from end portion 1228, opposing end portion 1228 of floor panel 1220 may be easily engaged and disengaged by drop floor support assembly 1195 for permitting floor panel 1220 to be easily raised and lowered. Floor panel 1220 is raised and lowered lifting mechanism 1226.

Lifting mechanism 1226 is preferably a hydraulic or pneumatic piston cylinder assembly having a first end coupled to a stationary supporting structure of the vehicle supporting storage body 1118 and a second end coupled to floor panel 1220 by trusses 1229. Actuation of lifting mechanism 1226 raises and lowers floor panel 1220 to decrease or increase the volume of either compartments 1207*a* or 1207*b*. Actuation of lifting mechanism 1226 also decreases or increases the volume of compartments 1207*a* or 1207*b* in communication with discharge opening 1206. As a result, refuse and commodities within compartments 1207*a* and 1207*b* are less compacted and are easier to unload. Moreover, because floor panel 1220 may be adjusted to various heights between floor 1180 and roof 1184, storage body 1118 provides increased flexibility in storing and containing various amounts of commodities.

Figure 15:
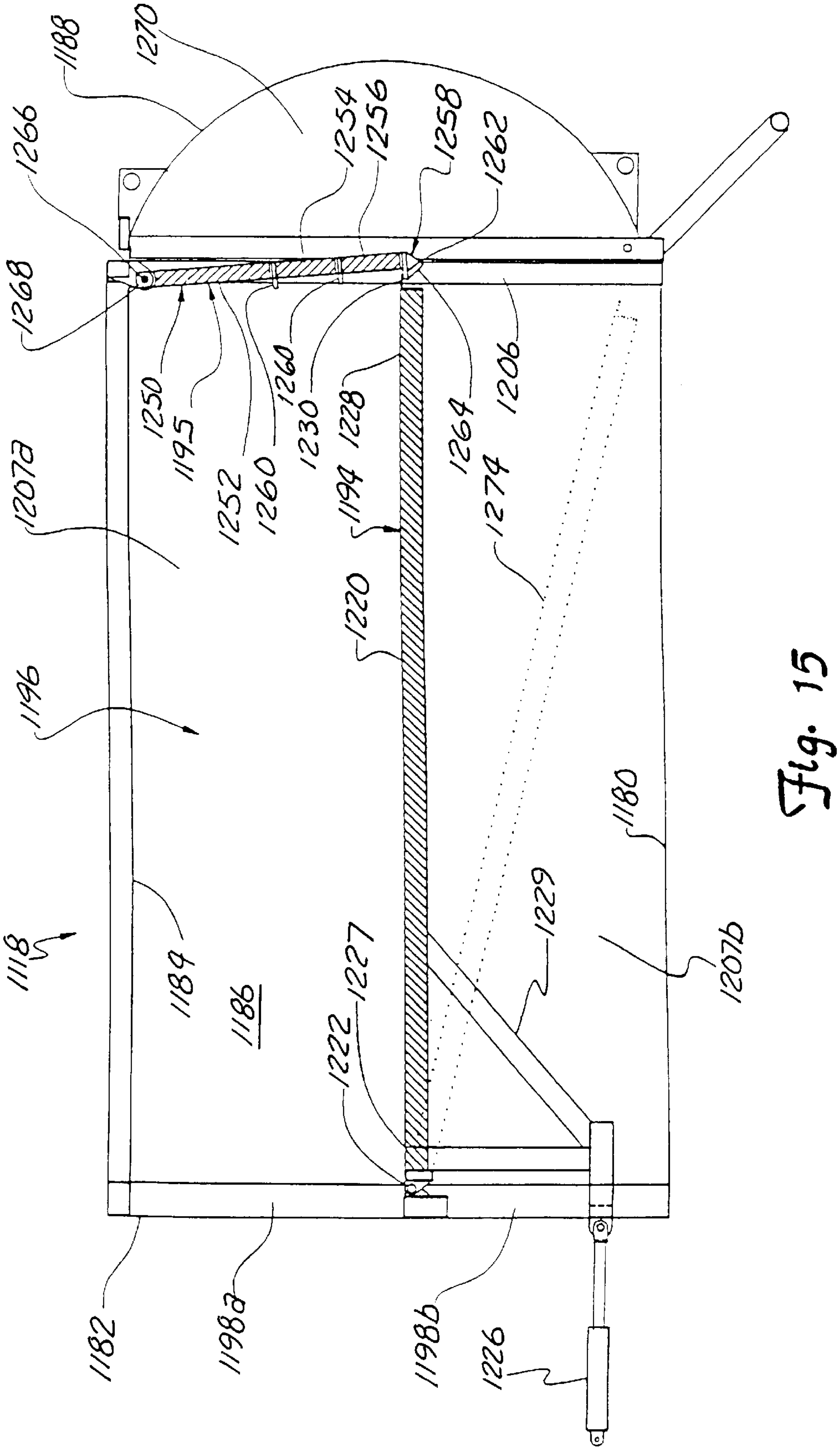
FIG. 15 is a schematic illustration of an alternate embodiment of the inventive storage body having a movable partition supported at a first height.

Drop floor support assembly 1195 supports end portion 1228 of floor panel 1220 in one of various positions between floor 1180 and roof 1184. As best shown by FIG. 15, drop floor support assembly 1195 includes bulkhead latch 1250. Bulkhead latch 1250 includes three sections: base section 1252, extension 1254 and extension 1256. To support floor panel 1220, bulkhead latch 1250 additionally includes latch attachment 1258. Base section 1252 is a generally flat wall extending between side walls 1186 from roof 1184 towards floor 1180. Base section 1252 is preferably hinged to and along roof 1184 about axis 1266 by hinge 1268. Hinge 1268 enables bulkhead latch 1250 to be moved and swung into and out of engagement with floor panel 1220. In lieu of being pivotally coupled to roof 1184, bulkhead latch 1250 may alternatively be pivotally coupled to floor 1180 so as to support floor panel 1220 at various heights above floor 1180. However, such an alternative arrangement would require lifting means to pivot the bulkhead latch about its lower hinge adjacent floor 1180.

Extensions 1254 and 1256 are generally elongate flat plates or walls that are interconnectable to one another and to base section 1252 to adjust and vary a vertical length of bulkhead latch 1250. Because extensions 1254 and 1256 may be removed or added as desired to vary the vertical length of bulkhead latch 1250, the vertical length of bulkhead latch 1250 may be adjusted based upon the vertical length at which floor panel 1220 is supported between floor 1180 and roof 1184. As a result, the vertical length of bulkhead latch 1250 may be adjusted so as to not extend below floor panel 1220 to maintain an unobstructed commodity flow passage area from lower compartment 1207*b* out discharge opening 1206 or into bubble compartment 1270 defined by tailgate assembly 1188. As can be appreciated, the vertical length of base section 1252 and extensions 1254 and 1256, as well as the number of extensions, may be varied as desired. Furthermore, although extensions 1254 and 1256 are illustrated as being removably coupled to one another for permitting the vertical length of bulkhead latch 1250 to be adjusted, extensions 1254 and 1256 may alternatively be slidably or pivotally coupled to one another and to base section 1252 for permitting adjustment of the vertical length of bulkhead latch 1250. For example, extensions 1254 and 1256 may alternatively slide upward and downward with respect to one another within guides until being locked or otherwise clamped in a desired location to provide bulkhead latch 1250 with a desired vertical length. Extensions 1254 and 1256 may also be hinged to one another so as to enable extensions 1254 or 1256 to be folded adjacent to one another and secured in position to provide bulkhead latch 1250 with a desired vertical length.

Extensions 1254 and 1256 each include a vertical stop 1260 preferably coupled to an upper extremity of each extension. Vertical stops 1260 comprise elongate flat bars or plates which extend inwardly from bulkhead latch 1250 into interior storage space 1196. Vertical stops 1260 provide an upper most limit or stop to prevent continued ascension of opposing end portion 1228. As can be appreciated, vertical stops 1260 may be omitted or replaced with other conventional limiting mechanisms such as limit switches and the like.

Latch attachment 1258 is removably coupled to a lower most section of bulkhead latch 1250. In the embodiment illustrated in FIG. 15, latch attachment 1258 is removably coupled to a lower end of extension 1256. Latch attachment 1258 generally includes support member 1262 and wedge members 1264. Support member 1262 is a generally elongate flat bar or plate which extends inwardly from bulkhead latch 1250 into interior storage space 1196 to act as a ledge for engaging catch 1230 and for supporting floor panel 1220 of drop floor assembly 1194. Alternatively, support member 1262 may have any one of various configurations for securing and engaging catch 1230 of floor panel 1220. Support member 1262 perferably extends sufficiently inward from base wall 1250 and extensions 1254, 1256 to stably support catch 1230 of floor panel 1220. Support member 1262 of latch attachment 1258 enables bulkhead latch 1250 to stably support floor panel 1220 between floor 1180 and roof 1184 when commodities are loaded into upper compartment 1207*a*. As a result, bulkhead latch 1250 reduces pressure requirements placed upon lifting mechanism 1226, enabling smaller, less expensive and less space consuming lifting mechanisms 1226 to be used.

Wedge members 1264 are generally triangular shaped members having an apex which are coupled and secured to a bottom of support member 1262. Wedge members 1264 engage catch 1230 of floor panel 1220 when floor panel 1220 is being raised by lifting mechanism 1226. As a result of its apex and shape, wedge members 1264 cause bulkhead latch 1250 to rotate or pivot counterclockwise about axis 1266 when in engagement with catch 1230. Consequently, wedge members 1264 enable continued ascension of floor panel 1220. Once catch 1230 of floor panel 1220 has ascended above the ledge member to which wedge members 1264 are coupled, bulkhead latch 1250 returns by rotating clockwise, preferably due to the force of gravity, so that the support member 1262 is positioned below catch 1230 to support floor panel 1220. Wedge members 1264 automatically rotate bulkhead latch 1250 to position catch 1230 of floor panel 1220 above support member 1262. Alternatively, other mechanisms may be used to temporarily rotate bulkhead latch 1250 to position catch 1230 of floor panel 1220 above and on top of support member 1262.

In addition to stably supporting floor panel 1220 between floor 1180 and roof 1184, bulkhead latch 1250 contains and segregates commodity within upper compartment 1207*a* from lower compartment 1207*b* and bubble compartment 1270. Because bulkhead latch 1250 provides a barrier separating upper compartment 1207*a* from lower compartment 1207*b* and bubble compartment 1270 when opposing end portion 1228 of floor panel 1220 is supported anywhere above a lower end of bulkhead latch 1250, floor panel 1220 is not limited to basically three positions as with center floor dovetails which require the dovetail to engage the roof, the floor or a flat tailgate member to segregate the compartments. As a result, floor panel 1220 may be supported at numerous locations between floor 1180 and roof 1184 for increased capacity adjustment of the compartments. In addition, because opposing end portion 1228 of floor panel 1220 contacts bulkhead latch 1250, rather than tailgate assembly 1188, opposing end portion 1228 does not need to extend completely to a rear end of storage body 1118. As a result, floor panel 1220 may have a variety of lengths between front wall 1182 and a rear of body 1118.

In addition to the above described advantages, bulkhead latch 1250 also enables floor panel 1220 to be supported at a plurality of heights between floor 1180 and roof 1184 to vary the volumes of upper compartment 1207*a* and lower compartment 1207*b* based upon varying commodity quantities during a collection route. In the preferred embodiment illustrated in FIGS. 15 and 16, the height of floor panel 1220 may be adjusted to one of four positions between floor 1180 and roof 1184. As illustrated in FIG. 15, catch 1230 of floor panel 1220 may supported by support member 1262 at a substantially intermediate position between floor 1180 and roof 1184 to provide upper compartment 1207*a* and lower compartment 1207*b* with substantially equal volumes. Furthermore, as illustrated by phantom lines 1274, opposing end portion 1228 of floor panel 1220 may be simply rested upon floor 1180 to increase the volume of upper compartment 1207*a* and to correspondingly decrease the volume of lower compartment 1207*b* for unloading upper compartment 1207*a*.

Figure 16:
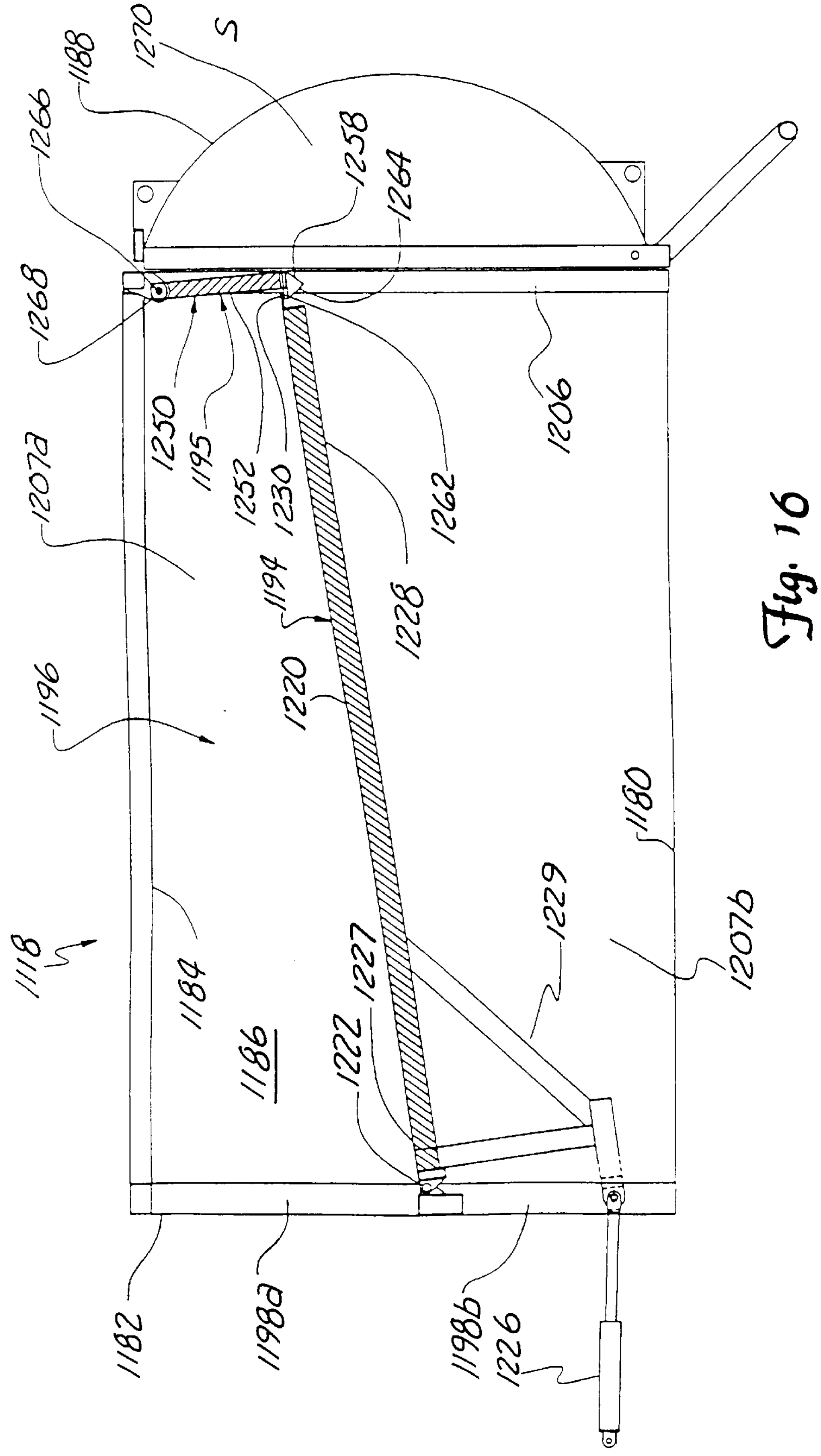
FIG. 16 is a schematic illustration of the storage body of FIG. 15 having the movable partition supported at a second height.

As best shown by FIG. 16, the volume of upper compartment 1207*a* may be decreased and the volume of lower compartment 1207*b* may be increased by raising opposing end portion 1228 of floor panel 1220 and supporting floor panel 1220 at the new height with drop floor support assembly 1195. To accommodate the new height of floor panel 1220, support member 1262 is vertically adjustable and repositionable along the vertical length of bulkhead latch 1250. In the preferred embodiment illustrated, the height at which support member 1262 is set to support opposing end portion 1228 of floor panel 1220 is vertically adjusted by removing extensions 1254 and 1256 (illustrated in FIG. 15) and reattaching latch attachment 1258 including support member 1262 to a lower end of base section 1252. Once bulkhead latch 1250 is appropriately modified, floor panel 1220 is raised by lifting mechanism 1226 so as to rest catch 1230 upon support member 1262 below base section 1252.

As can be appreciated, support member 1262 and extension 1254 may also support floor panel 1220 at yet another height. To support floor panel 1220 adjacent extension 1254, extension 1256 and latch attachment 1258 are removed. Latch attachment 1258 is remounted below extension 1254. As can be further appreciated, any number of extensions may be added to base wall 1250 between base section 1252 and latch attachment 1258 for providing any number of a variety of different volume adjustments for upper compartment 1207*a* and lower compartment 1207*b*.

As can be appreciated, bulkhead latch 1250 may alternatively be configured for enabling support member 1262 to be slidably repositioned with the aide of guides and to be supported along the vertical length of bulkhead latch 1250 to thereby alleviate the need for removing one or more of extensions 1254, 1256.

Figure 17:
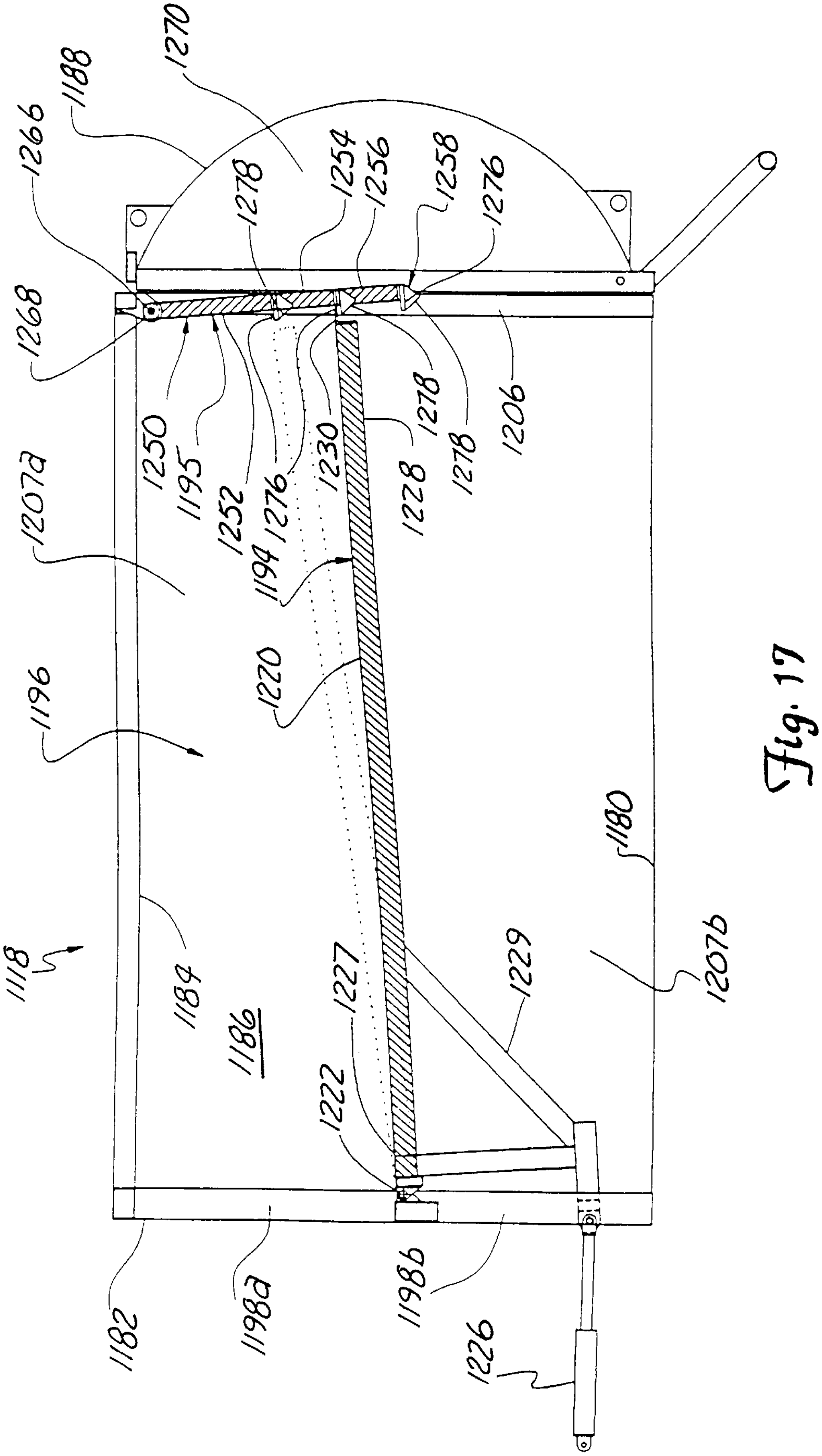
FIG. 17 is a schematic illustration of an alternate embodiment of the inventive storage body.

Furthermore, as illustrated by FIG. 17, bulkhead latch 1250 may alternatively include a plurality of spaced support members 1276 and wedge members 1278 along the vertical length of bulkhead latch 1250 to alleviate the need for removing one or more of extensions 1254 and 1256. With such an alternative arrangement including spaced ledge members 1276, floor panel 1220 would be pivoted and ratcheted upward to a desired support member 1276 to provide desired volumes to upper compartment 1207*a* and lower compartment 1207*b*. As shown by FIG. 17, extensions 1254 or 1256 project below floor panel 1220 when floor panel 1220 is raised above the lower most extension. As a result, a portion of the lower most extension projects below floor panel 1220 and may obstruct commodity flow out of lower compartment 1207*b*. To maintain an unobstructed commodity passage from lower compartment 1207*b* through discharge opening 1206 and into bubble compartment 1270, extensions 1254 and 1256 are preferably removed, slid or folded so as to be out of the commodity flow passage.

Figure 18:
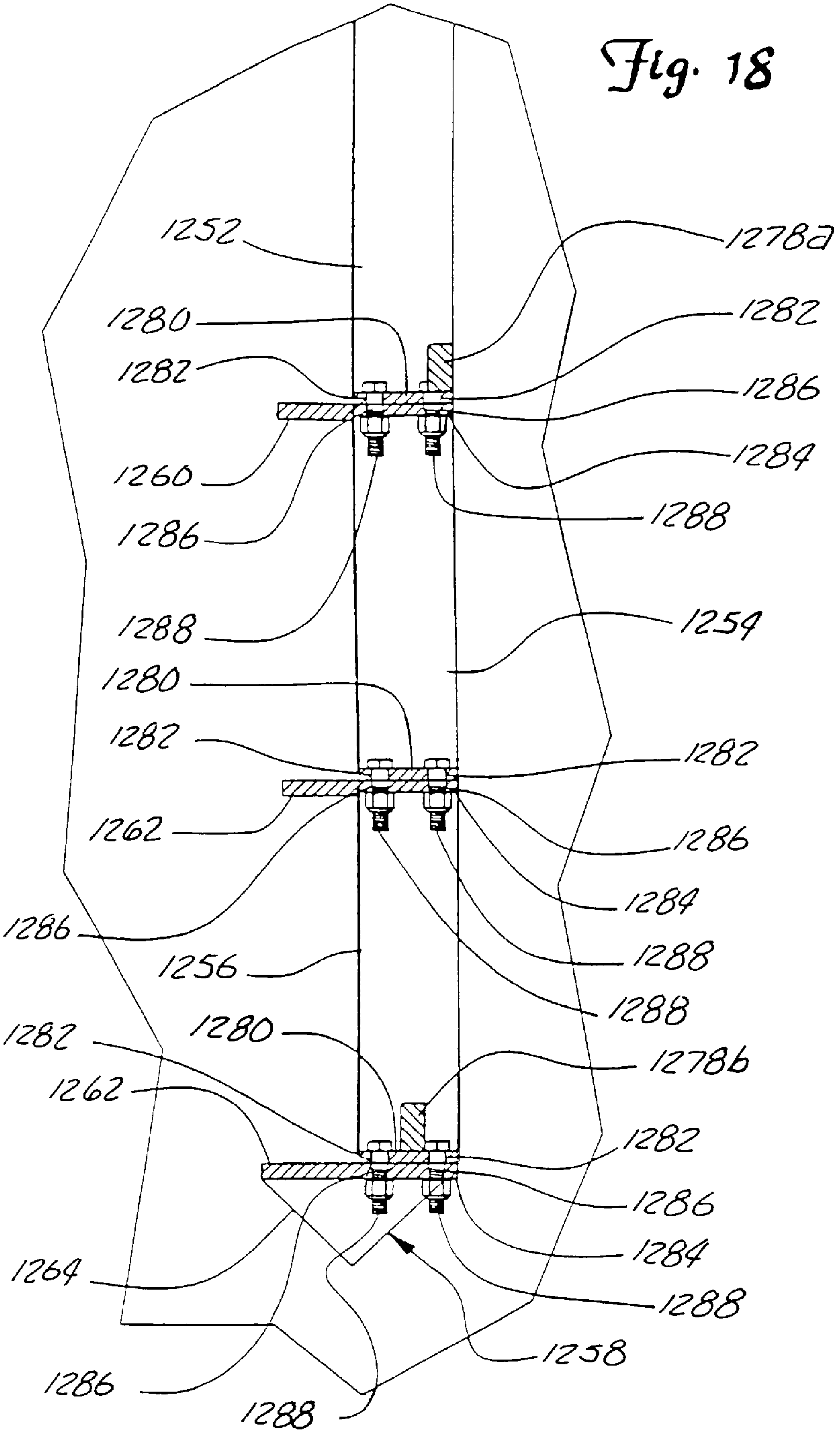
FIG. 18 is an enlarged sectional view of a bulkhead latch of the inventive storage body.

FIG. 18 is a fragmentary sectional view illustrating bulkhead latch 1250 in greater detail. As best shown by FIG. 18, base section 1252 and extension 1256 include latch bars 1278*a* and 1278*b*, respectively. Latch bars 1278*a* and 1278*b* project from opposite sides of bulkhead latch 1250 and are shaped for engaging latch retainers 1304 (illustrated in FIGS. 19 and 20) for preventing rotation of bulkhead latch 1250.

As further shown by FIG. 18, each section, base section 1252, extension 1254 and extension 1256, includes a generally horizontal plate 1280 having bores 1282. Extensions 1254 and 1256 and latch attachment 1258 additionally include a generally horizontal plate 1284 having bores 1286 at their upper ends. Upon alignment, bores 1282 and 1286 receive removable coupling members 1288 to removably mount extension 1254 to base section 1252, extension 1256 to extension 1254 and latch attachment 1258 to extension 1256. Although coupling members 1288 are illustrated as a bolt and nut assembly, coupling members 1288 may alternatively comprise any one of a variety of coupling structures. In lieu of removably bolting base section 1252, extensions 1254, 1256 and latch attachment 1258 to one another, base section 1252, extensions 1254, 1256 and latch attachment 1258 may alternatively be removably coupled to one another by another well-known conventional coupling or quick release mechanisms to enable a user to quickly and easily attach or unattach extensions 1254 and 1256 and latch attachment 1258 to adjust the vertical length of bulkhead latch 1250. In addition, latch attachment 1258 may also be fixedly coupled to extension 1256 by welding or other permanent mounting methods. In this alternative arrangement, extension 1256 and the permanently attached latch attachment 1258 are mounted as a lower most section of bulkhead latch 1250 to use bulkhead latch 1250 as a supporting structure for supporting floor panel 1220.

Figure 19:
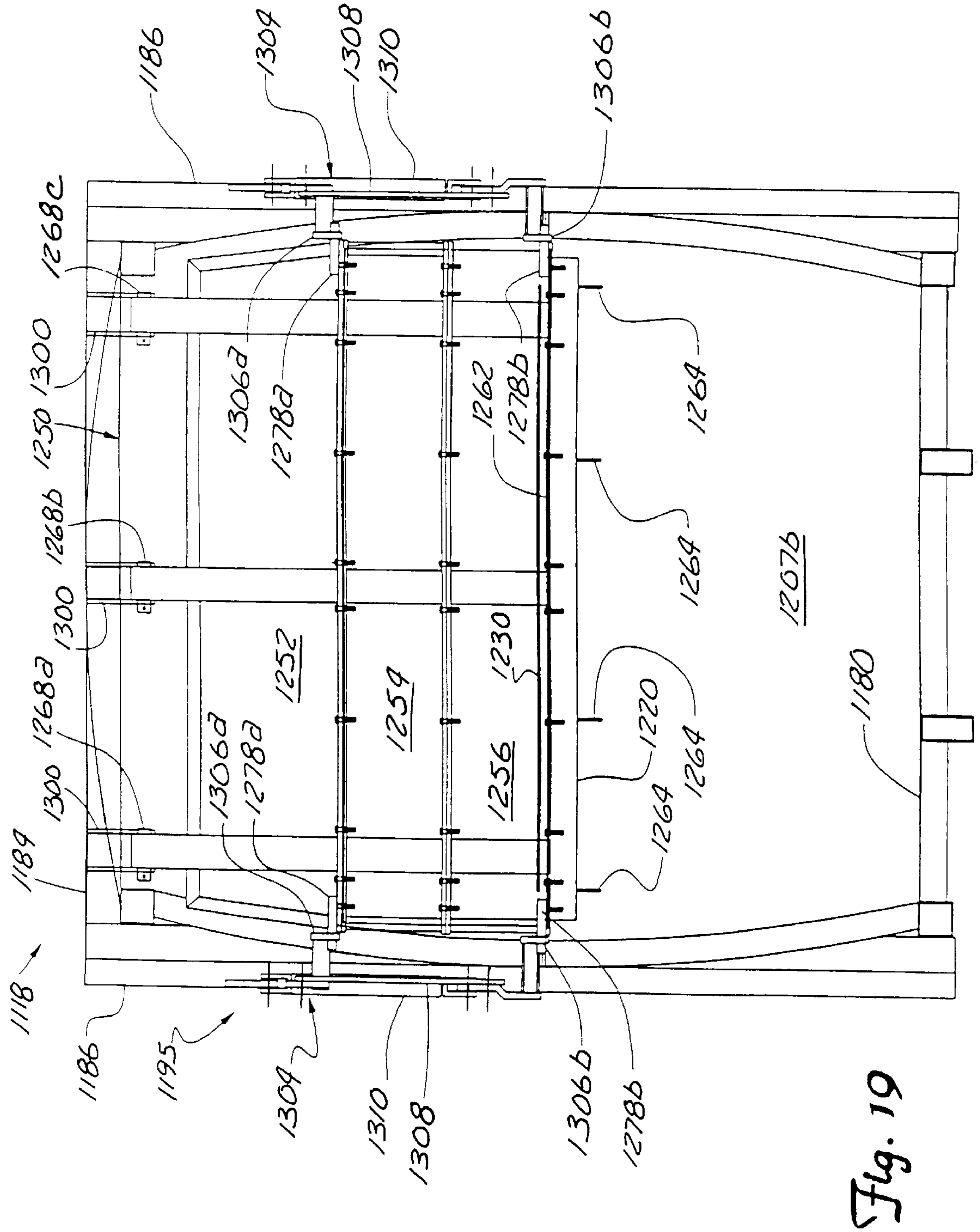
FIG. 19 is a rear elevational view of the inventive storage body of FIG. 15.
Figure 20:
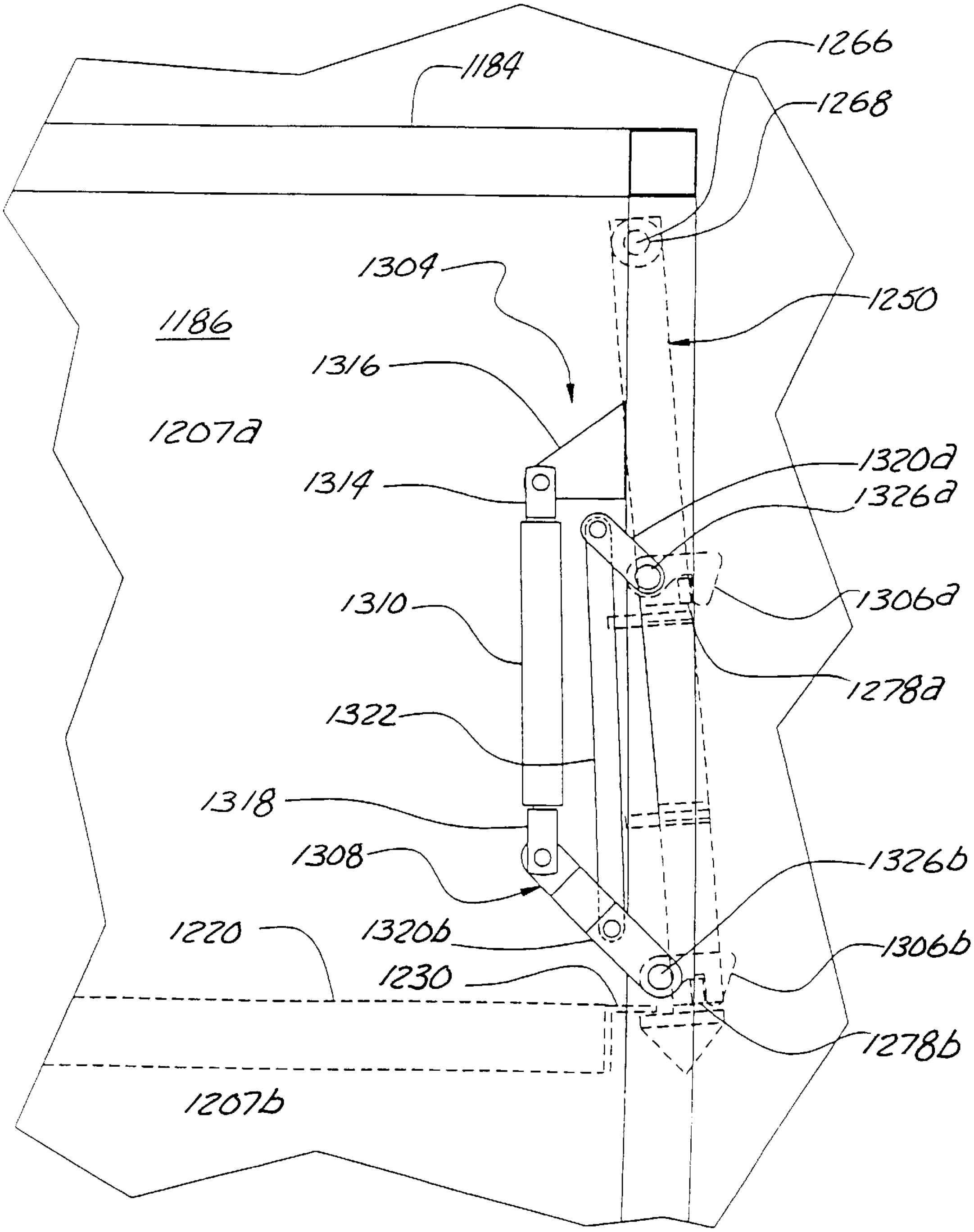
FIG. 20 is an enlarged side elevational view of a latch retainer of the inventive storage body of FIG. 15.

FIG. 19 is a rear view of storage body 1118 with portions removed for illustration purposes. As best shown by FIG. 20, bulkhead latch 1250 is pivotally coupled to roof 1184 by three distinct hinge sections 1268*a*, 1268*b* and 1268*c* which are supported below roof 1184 by hinge brackets 1300. As discussed above, bulkhead latch 1250 pivotally rotates about hinges 1268*a*–1268*c* between an engaged position wherein bulkhead latch 1250 engages floor panel 1220 to support floor panel 1220 and a disengaged position wherein bulkhead latch 1250 is disengaged from floor panel 1220 to allow floor panel 1220 to descend to floor 1180.

To prevent accidental movement of bulkhead latch 1250 and to maintain bulkhead latch 1250 in the engaged position as storage body 1118 is tipped during unloading of commodities from lower compartment 1207*b*, drop floor support assembly 1195 additionally includes bulkhead latch retainers 1304. Each latch retainer 1304 selectively prevents rotation of bulkhead latch 1250 and includes hooks 1306*a*, 1306*b*, linkage 1308 and actuating mechanism 1310. Hooks 1306*a* and 1306*b* are positioned adjacent to latch bars 1278*a* and 1278*b*. Hooks 1306*a* and 1306*b* move between a first engaged position and a second disengaged position. In the engaged position, hooks 1306*a* and 1306*b* engage latch bars 1278*a* and 1278*b*, respectively. In the disengaged position, hooks 1306*a* and 1306*b* permit bulkhead latch 1250 to rotate about hinges 1268*a*–1268*c*. Hooks 1306*a* and 1306*b* are preferably linked to one another and to actuator 1310 by linkage 1308.

Actuator 1310 preferably comprises a hydraulic cylinder assembly having a first end coupled to side wall 1186 and a second end coupled to linkage 1308. Selective actuation of actuator 1310 rotates hooks 1306*a* and 1306*b* between the engaged position and the disengaged position to selectively retain and secure bulkhead latch 1250 in a latched orientation relative to floor panel 1220. As a result, latch retainer 1304 retains bulkhead latch 1250 and floor panel 1220 in the desired orientation above floor 1180 as body 1118 is tilted for unloading of lower compartment 1207*b*. Alternatively, latch retainer 1304 may be actuated to move hooks 1306*a* and 1306*b* into the disengaged position, thereby allowing bulkhead latch 1250 to swing about hinges 1268 and allowing floor panel 1220 to descend for unloading of upper compartment 1207*a* (shown in FIG. 14).

As can be appreciated, latch retainer 1304 may include various alternative retaining mechanisms. For example, hooks 1306*a* and 1306*b* may alternatively be actuated by independent actuators 1310. Each retainer 1304 may alternatively include greater than or less than two hooks which may engage bulkhead latch 1250 at a variety of locations. Retaining members other than hooks may be used to engage bulkhead latch 1250. Furthermore, in lieu of actuator 1310, hooks 1306*a* and 1306*b* may be manually actuated for selective rotation of bulkhead latch 1250 between the engaged and disengaged positions.

FIG. 20 is an enlarged fragmentary side elevational view illustrating a single bulkhead latch retainer 1304 in greater detail. As best shown by FIG. 20, actuator 1310 preferably comprises a pneumatic or hydraulic cylinder assembly having a first end 1314 fixedly coupled to side wall 1186 by bracket mount 1316 and a piston end 1318 pivotally coupled to linkage 1308. Linkage 1308 includes arms 1320*a* and 1320*b* which are pivotally connected by link 1322. Arms 1320*a* and 1320*b* are fixedly coupled to hooks 1306*a* and 1306*b*, respectively. As shown by FIG. 20, retraction of piston end 1318 of actuator 1310 causes simultaneous clockwise rotation about axes 1326*a*, 1326*b* of hooks 1306*a* and 1306*b* into engagement with latch bars 1278*a* and 1278*b* as illustrated. In contrast, extension of piston end 1318 of actuator 1310 causes simultaneous counterclockwise rotation of hooks 1306*a* and 1306*b* about axes 1326*a* and 1326*b* out of engagement with latch bars 1278*a* and 1278*b*, respectively. Thus, selective retraction of piston end 1318 of actuator 1310 moves hooks 1306*a* and 1306*b* into engagement with latch bars 1278*a* and 1278*b* to retain support member 1262 in a latched relationship beneath catch 1230 of floor panel 1220. Selective extension of piston end 1318 of actuator 1310 disengages hooks 1306*a* and 1306*b* from latch bars 1278*a* and 1278*b*, respectively, to enable support member 1262 of bulkhead latch 1250 to move counterclockwise out from beneath catch 1230. As a result, floor panel 1220 may be lowered to increase the volume of upper compartment 1207*a* and to decrease the volume of lower compartment 1207*b* or to unload commodity from upper compartment 1207*a*.

Figure 21:
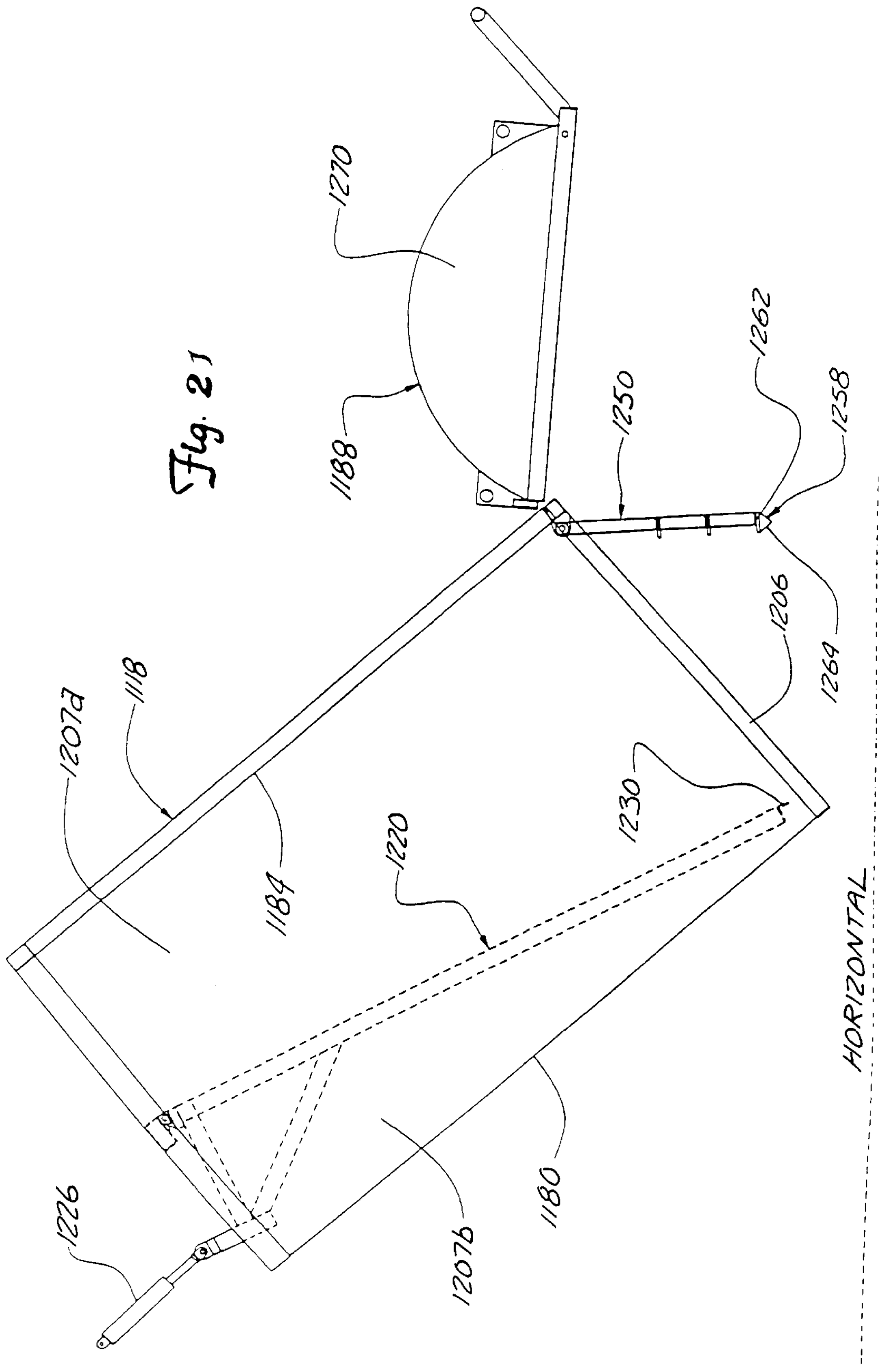
FIG. 21 is a schematic illustration of the inventive storage body of FIG. 15 in an unloading position.

FIG. 21 is a schematic diagram illustrating unloading of commodity from storage body 1118. To unload commodities from storage body 1118, tailgate assembly 1188 is first opened for the removal of commodity from bubble compartment 1270 and for opening the portion of discharge opening 1206 in communication with lower compartment 1207*b*. Storage body 1118 is then tilted or tipped with conventional storage body tilting mechanisms. Bulkhead latch retainers 1304 illustrated in FIGS. 19 and 20 are maintained in the engaged position to retain bulkhead latch 1250 in the engaged position for supporting floor panel 1220 above floor 1180. With the assistance of gravity, commodity within lower compartment 1207*b* is unloaded out discharge opening 1206.

Once commodities from lower compartment 1207*b* and bubble compartment 1270 are substantially emptied from storage body 1118, latch retainers 1304 are moved into the disengaged position to permit rotation of bulkhead latch 1250. Tipping storage body 1118 clockwise causes bulkhead latch 1250 to rotate and pivot counterclockwise with respect to discharge opening 1206 and floor panel 1220. As a result, support member 1262 also rotates counterclockwise to release catch 1230 of floor panel 1220, causing floor panel 1220 to fall to floor 1180 by the force of gravity. Alternatively, floor panel 1220 may be lowered to floor 1180 by lifting mechanism 1226. As a result, the volume of upper compartment 1207*a* in communication with discharge opening 1206 is increased to lessen compaction of commodities within upper compartment 1207*a* for easier unloading. The commodities within upper compartment 1207*a* are then discharged out discharge opening 1206 with the assistance of gravity.

After the commodities are discharged from upper compartment 1207*a*, storage body 1118 is tilted back into a generally horizontal position to cause bulkhead latch 1250 to return to its initial vertical position. Lifting mechanism 1226 lifts floor panel 1220 until catch 1230 engages wedge member 1264 to temporarily rotate bulkhead latch 1250 counterclockwise until catch 1230 is positioned above support member 1262. Bulkhead latch 1250 then pivots clockwise due to gravity so as to position support member 1262 below catch 1230 for supporting floor panel 1220 between floor 1180 and roof 1184 so that storage body 1118 may once again be filled with commodity during a collection route.

Figure 22:
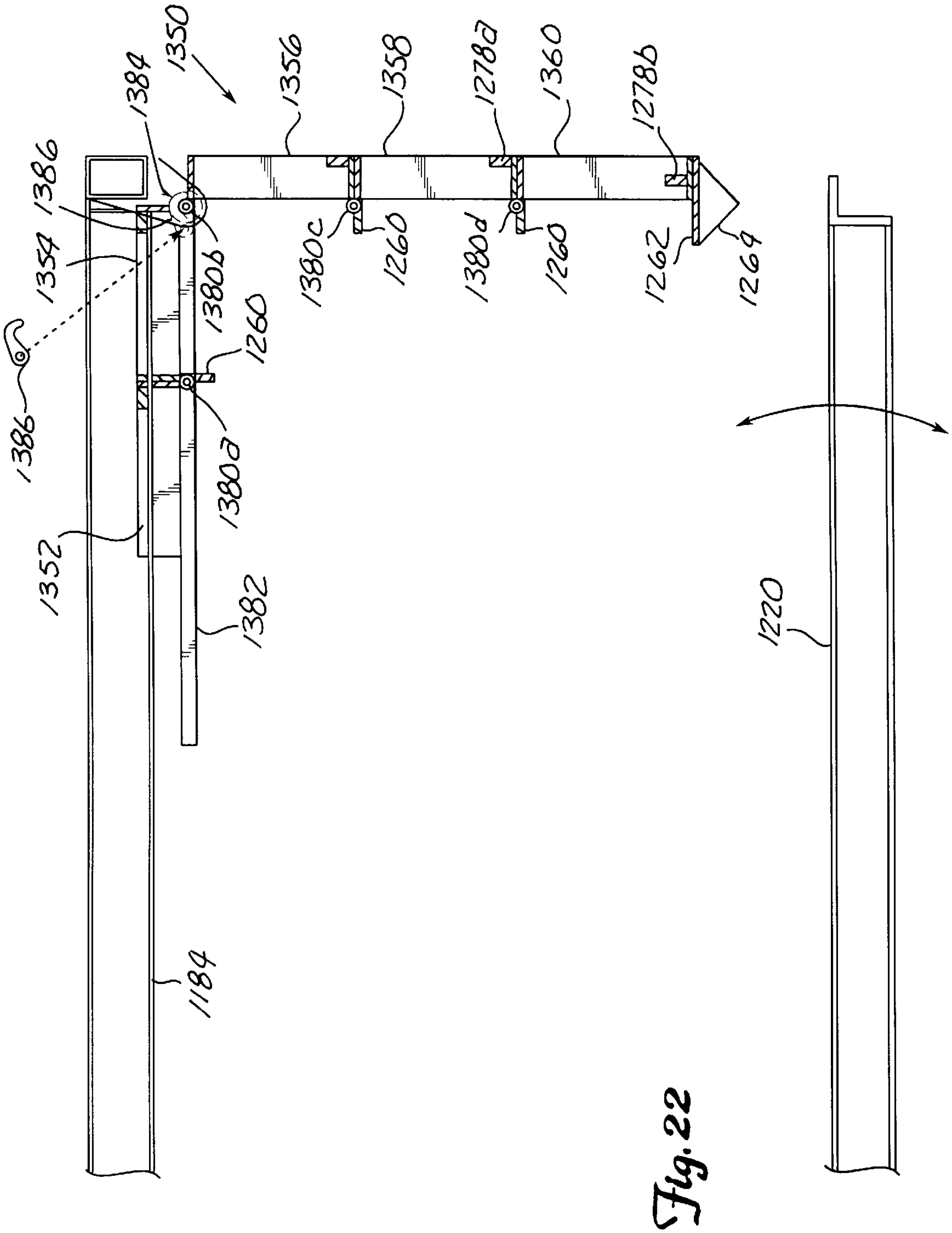
FIG. 22 is a schematic illustration of an alternate embodiment of the inventive storage body.
Figure 23:
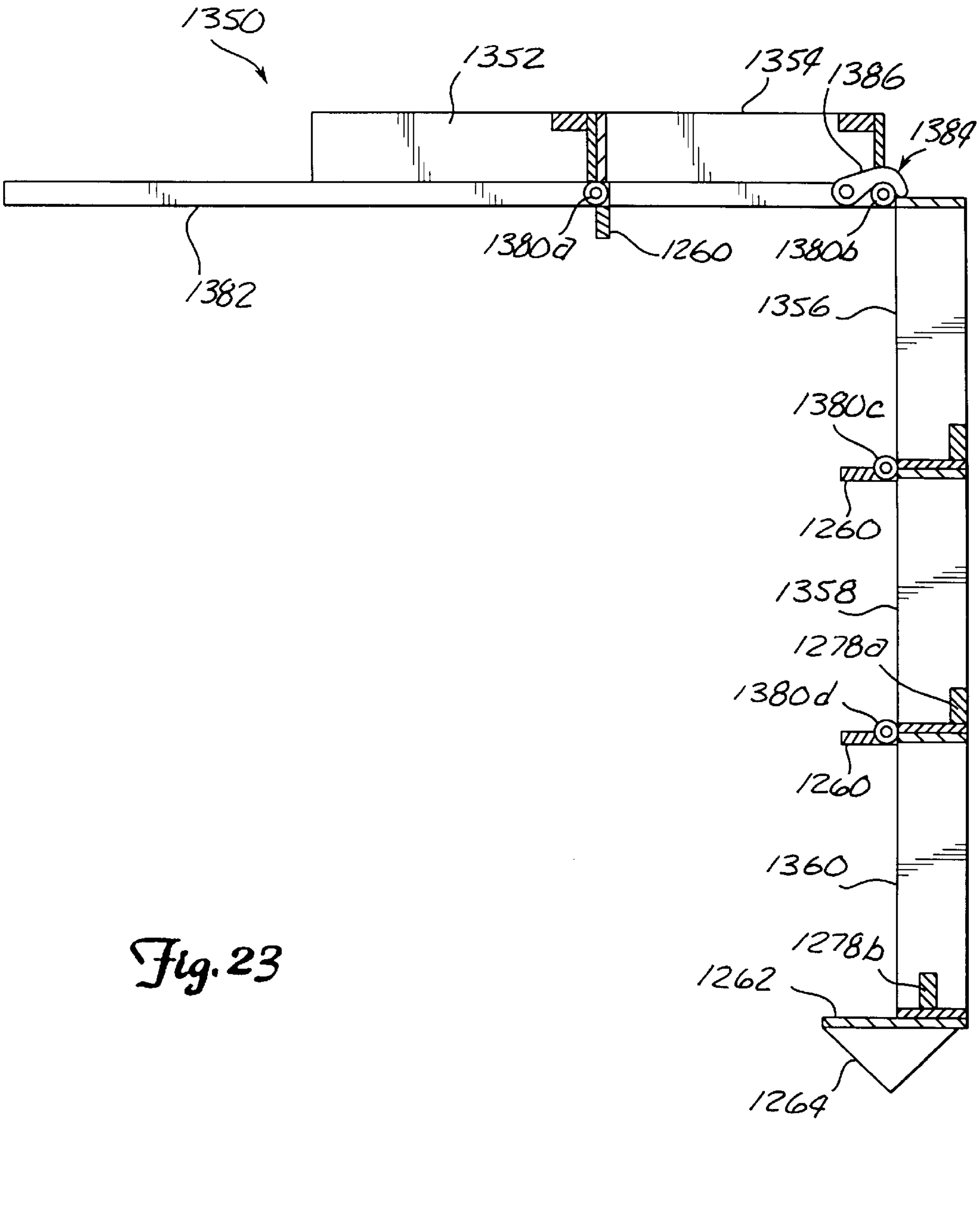
FIG. 23 is an enlarged view of a bulkhead latch of the inventive storage body of FIG. 22.

FIGS. 22 and 23 illustrate bulkhead latch 1350, an alternate emodiment of bulkhead latch 1250 shown in FIGS. 15–21. Bulkhead latch 1350 is similar to bulkhead latch 1250 except that bulkhead latch 1350 includes base 1352, extensions 1354, 1356, 1358, 1360, hinge joints 1380, guiding track 1382 and locking mechanism 1384. For ease of illustration, those elements of bulkhead latch 1350 which are the same as corresponding elements of bulkhead latch 1250 are numbered similarly. Base 1352 is an elongate rigid plate supported adjacent roof 1184 by guiding track 1382. Base 1352 is pivotally coupled at one end to extension 1354 by hinge joint 1380*a*. Extensions 1354, 1356, 1358 are similar to extension 1254 of bulkhead latch 1250. Extension 1360 is similar to extension 1256 of bulkhead latch 1250. Extensions 1354, 1356, 1358, 1360 are each pivotally coupled to one another by hinge joints 1380.

Hinge joints 1380 comprise conventionally known hinge mechanisms for pivotally joining adjacent members. Hinge joints 1380 preferably comprise double leaf hinges that rotate about a pin. Alternatively, joints 1380 may consist of any one of a variety of hinge mechanisms. Hinge joints 1380 permit extensions 1354, 1356, 1358 and 1360 to fold or bend at least ninety degrees relative to one another so as to permit extensions 1354, 1356, 1358, 1360 to hang vertically or extend horizontally adjacent roof 1184 within guiding track 1382.

Guiding track 1382 preferably comprises a pair of tracks having C-shaped cross sections extending along opposite sidewalls just below roof 1184. Guiding track 1382 is preferably sized for slidably receiving base 1352 and extensions 1354, 1356, 1358 and 1360. As can now be appreciated, base 1352 and extensions 1354, 1356, 1358, 1360 may alternatively additionally include rollers along each sidewall for ease of movement within track 1382. Guiding track 1382 guides movement of base 1352 and extensions 1354, 1356, 1358, 1360 adjacent roof 1184 between a front and a rear of the refuse collection vehicle. In addition, track 1382 supports base 1352 and extensions 1354, 1356, 1358, 1360 adjacent roof 1184. As a result, extensions 1354, 1356, 1358, 1360 form an elongate flexible bulkhead having an end that is movable and repositionable relative to roof 1184 without the necessity of removing and replacing any sections of the bulkhead. Consequently, the vertical length of bulkhead 1350 may be easily and quickly adjusted in the field by simply rolling base 1352 and extensions 1354, 1356, 1358, 1360 vertically upward or downward to adjust the vertical length by which extension 1360 and latch attachment 1258 extend below roof 1184. Once repositioned, bulkhead 1350 is locked in place by locking mechanism 1384. As discussed above, the pivoting of bulkhead 1350 is prevented by latch retainer 1304 (shown in FIG. 20).

Locking mechanism 1384 preferably comprises a latch dog 1386 pivotally coupled to the storage body. Latch dog 1386 pivots between a first position in which latch dog 1385 engages a projecting pin of one of hinge joints 1380 just inside of track 1382 and a second position in which latch dog 1386 disengages the projecting pins of hinge joints 1380. Thus, in the first position, latch dog 1386 prevents bulkhead 1350 from being rolled and repositioned to secure bulkhead 1350 in place. Latchdog 1386 is preferably moved between the first and second positions by a linear actuator such as a hydraulic cylinder assembly.

Figure 24:
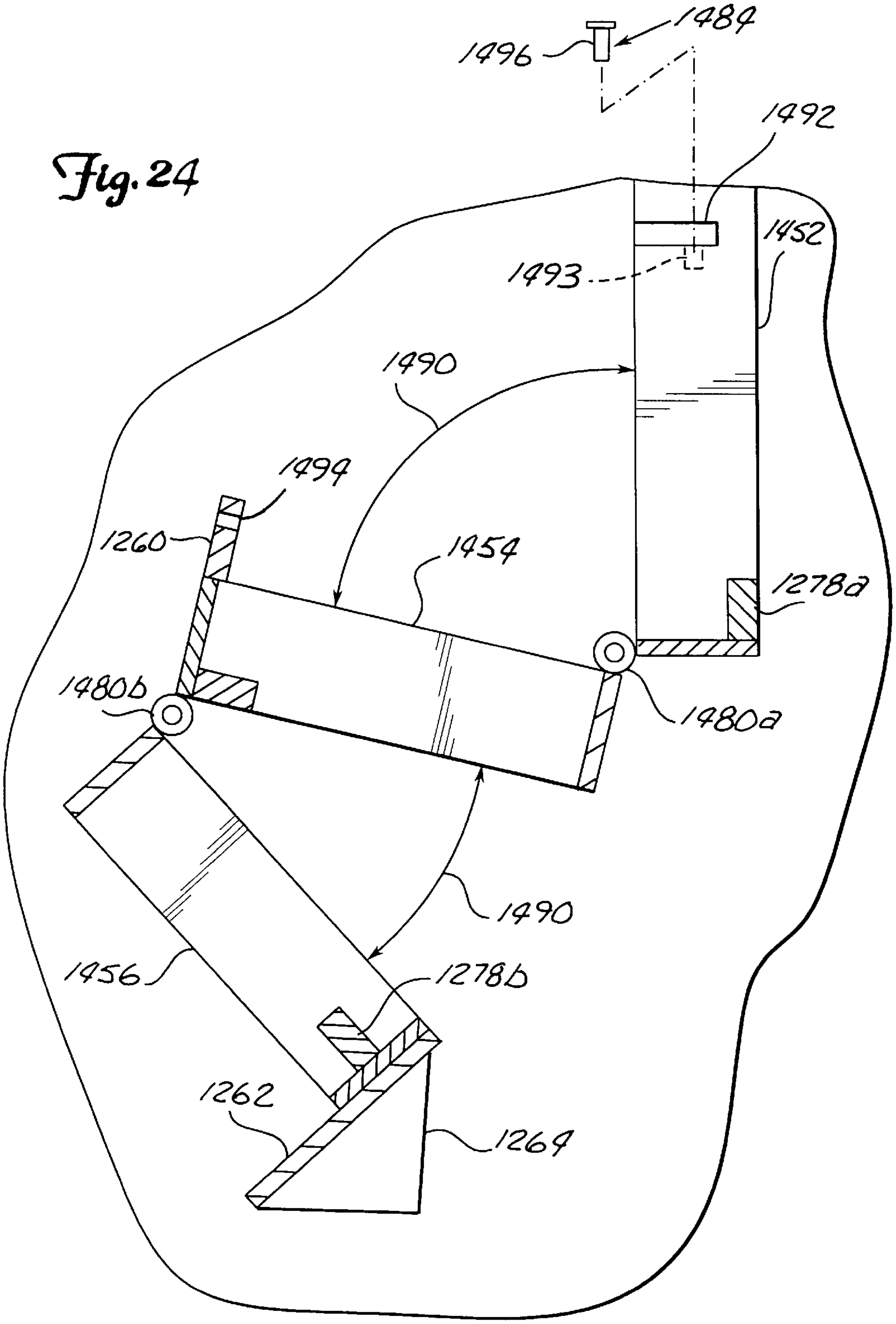
FIG. 24 is an enlarged elevational view of an alternate embodiment of the bulkhead latch of FIG. 23.

FIG. 24 is a fragmentary side elevational view of bulkhead 1450, an alternate embodiment of bulkhead 1350 illustrated in FIGS. 22 and 23. Bulkhead 1450 is similar to bulkhead 1350 except that bulkhead 1450 includes base 1452, extensions 1454, 1456, hinge joints 1480 and locking mechanism 1484. Base 1452 is similar to base 1252 (shown in FIGS. 15–21) except that base 1452 is pivotally coupled at an innermost side to extension 1454 by hinge joint 1480*a*. Extension 1454 is similar to extension 1254 (shown in FIGS. 15–21) except that extension 1454 is pivotally coupled to base 1452 at its upper innermost edge by hinge joint 1480*a* and is pivotally coupled to extension 1456 at its lower outermost end by hinge joint 1480*b*. Extension 1456 is similar to extension 1256 (shown in FIGS. 15–21) except that extension 1456 is pivotally coupled at its upper outermost edge to extension 1454. For ease of illustration, those elements of bulkhead 1450 which are the same as corresponding elements of bulkhead 1350 are numbered similarly. Because extensions 1454, 1456 are pivotally coupled to one another along alternating inner and outer most edges, extensions 1454 and 1456 may be folded adjacent one another in a manner similar to an accordion as shown by arrows 1490.

Once folded in position, extensions 1454 and 1456 are held in place by locking mechanism 1484. Locking mechanism 1484 includes slot 1492, bore 1493, bore 1494 and pin 1496. Slot 1492 extends within base 1452 and is sized for receiving stop 1260. Bore 1493 extends into base 1452 and is sized for receiving pin 1496. Stop 1260 includes a bore 1494 extending through stop 1260 and sized for receiving pin 1496. Pin 1496 is sized for being positioned through bores 1492 and 1494 for locking stop 1260 within slot 1492 to secure extension 1454 adjacent to base 1452. As a result, the lower end (extension 1456) of bulkhead 1450 may be vertically adjusted relative to roof 1184 without the necessity of removing sections of bulkhead 1450. Thus, bulkhead 1450 may be quickly and easily adjusted in the field.

In conclusion, the multiple compartment storage body of the present invention enables volumes of upper and lower compartments separated by a vertically movable partition to be easily adjusted based upon varying commodity quantities of a collection route. The volumes of the upper and lower compartments are adjusted by pivotally coupling a first end of a partition to a support structure and vertically pivoting a second end portion of the same partition. A movable bulkhead latch is positioned proximate the second end portion of the partition and moves so as to engage and disengage the second end portion. Because the bulkhead latch engages the second opposing end portion and supports the second opposing end portion of the partition, larger, more space consuming and more expensive lifting mechanisms for pivoting the partition are not necessary. Furthermore, because the bulkhead latch segregates the upper compartment and the lower compartment, the partition may be supported at a larger number of positions and may have a variety of lengths while still allowing segregation of commodities within the upper and lower compartments. Because the bulkhead latch supports the second end portion of the partition at a plurality of distances between the roof and the floor of the storage body, a variety of volumes for the upper and lower compartments may be selected. Because the bulkhead latch has an adjustable vertical length, obstructions of commodity flow out of the compartments is minimized. In sum, the storage body of the present invention permits refuse and recyclable commodities to be more easily collected, transported and discharged.

Although the present invention has been described with reference to preferred embodiments, workers skilled in the art will recognize that changes may be made in form and detail without departing from the spirit and scope of the invention.

What is claimed is:

1. A multiple compartment storage body for a refuse collection vehicle, the body comprising:

a floor;

a roof;

a plurality of walls extending between the floor and the roof, the plurality of walls including a front wall, a rear wall, and side walls between the front wall and the rear wall, wherein the roof, floor and walls define an interior storage space and wherein the walls define a discharge opening;

a partition having first and second opposing end portions, wherein the first opposing end portion is pivotally supported intermediate the floor and the roof between the side walls to allow the second opposing end portion to pivot between the floor and the roof; and a bulkhead latch movable between a first engaged position and a second disengaged position, wherein the bulkhead latch engages the second opposing end portion of the partition in the first engaged position to support the second opposing end portion above the floor and wherein the bulkhead latch is disengaged from the second opposing end portion of the partition in the second disengaged position to permit the second opposing end portion to pivot to the floor.

2. The storage body of claim 1 wherein the bulkhead latch is pivotally supported adjacent the roof and extends from the roof into the interior storage space proximate the second opposing end portion.

3. The storage body of claim 2 wherein the bulkhead latch includes at least one wedge member extending downward from at least one of the plurality of support members for pivoting the bulkhead latch when in engagement with the second opposing end portion of the partition.

4. The storage body of claim 2 including:

a latch retainer for selectively preventing rotation of the bulkhead latch.

5. The storage body of claim 4 wherein the latch retainer includes at least one hook movable between a first engaged position and a second disengaged position, wherein the hook engages the bulkhead latch in the first engaged position to prevent rotation of the bulkhead latch and wherein the hook is disengaged from the bulkhead latch to permit rotation of the bulkhead latch.

6. The storage body of claim 1 wherein the bulkhead latch has a vertical length and wherein the bulkhead latch includes a support member coupled to the bulkhead latch so as to be repositionable along the vertical length of the bulkhead latch.

7. The storage body of claim 1 wherein the bulkhead latch includes a plurality of spaced support members for engaging and supporting the second opposing end portion above the floor.

8. The storage body of claim 1 wherein the bulkhead latch includes a plurality of sections pivotably coupled to one another.

* * * * *